United States Patent
Tsuda et al.

(10) Patent No.: US 9,567,964 B2
(45) Date of Patent: Feb. 14, 2017

(54) CONTROL DEVICE FOR VEHICLE DRIVE DEVICE

(71) Applicant: AISIN AW CO., LTD., Anjo-shi, Aichi (JP)

(72) Inventors: Kohei Tsuda, Nishio (JP); Tomohiro Onouchi, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 191 days.

(21) Appl. No.: 14/356,516

(22) PCT Filed: Jan. 28, 2013

(86) PCT No.: PCT/JP2013/051764
§ 371 (c)(1),
(2) Date: May 6, 2014

(87) PCT Pub. No.: WO2013/111901
PCT Pub. Date: Aug. 1, 2013

(65) Prior Publication Data
US 2014/0336911 A1    Nov. 13, 2014

(30) Foreign Application Priority Data

Jan. 27, 2012  (JP) .................................. 2012-015618

(51) Int. Cl.
*F02N 11/08*    (2006.01)
*B60K 6/547*    (2007.10)
(Continued)

(52) U.S. Cl.
CPC ........... *F02N 11/0803* (2013.01); *B60K 6/547* (2013.01); *B60L 3/106* (2013.01); *B60L 11/14* (2013.01);
(Continued)

(58) Field of Classification Search
CPC ...... B60W 10/06; B60W 10/08; B60W 10/02; B60W 20/40; B60W 20/00; B60W 20/10; B60W 2710/021; B60W 10/11; Y10S 903/93; Y10S 903/902; Y10S 903/946; Y10S 903/919; Y10S 903/914; Y10S 903/945; Y10S 903/903; Y10S 903/917; B60K 6/48; B60K 6/547; Y02T 10/6221; Y02T 10/6286; Y02T 10/62; Y02T 10/6252; Y02T 10/6234; Y02T 10/6239; Y02T 10/626; Y02T 10/6217; F02N 11/0803; B60L 11/14; B60L 3/106; F02D 28/00; F16H 61/061
(Continued)

(56) References Cited

U.S. PATENT DOCUMENTS 6,077,186 A * 6/2000 Kojima ..................... B60K 6/48
                                                    180/65.25
6,655,485 B1 * 12/2003 Ito ......................... B60W 20/40
                                                    180/65.6
(Continued)

FOREIGN PATENT DOCUMENTS

JP      A-9-65513       3/1997
JP      A-11-178113     8/1999
(Continued)

OTHER PUBLICATIONS

International Search Report issued in International Application No. PCT/JP2013/051764 dated Mar. 12, 2013.

*Primary Examiner* — Sizo Vilakazi
(74) *Attorney, Agent, or Firm* — Oliff PLC

(57) ABSTRACT

A control device that controls a vehicle drive device. A starting control section executes internal combustion engine starting control in which the internal combustion engine in a stationary state is started while causing the disconnecting (Continued)

engagement device to transition from a disengaged state to a direct engagement state. A timing decision section that decides, on the basis of a rotational speed of the internal combustion engine, a supply start timing to start supply of a hydraulic pressure to a specific engagement device, which is one of the plurality of shifting engagement devices and is caused to transition from a disengaged state to a direct engagement state in order to establish a target shift speed for the speed change mechanism after a change, in the case where the target shift speed is changed during execution of the internal combustion engine starting control.

7 Claims, 10 Drawing Sheets

(51) Int. Cl.
*B60L 11/14* (2006.01)
*B60W 10/06* (2006.01)
*B60L 3/10* (2006.01)
*B60W 10/11* (2012.01)
*B60W 20/00* (2016.01)
*F02D 28/00* (2006.01)
*F16H 61/06* (2006.01)
*F16H 61/08* (2006.01)
*B60K 6/48* (2007.10)

(52) U.S. Cl.
CPC .............. *B60W 10/06* (2013.01); *B60W 10/11* (2013.01); *B60W 20/10* (2013.01); *F02D 28/00* (2013.01); *F16H 61/061* (2013.01); *B60K 2006/4825* (2013.01); *B60L 2240/421* (2013.01); *B60L 2240/423* (2013.01); *B60L 2240/80* (2013.01); *B60W 2510/10* (2013.01); *B60W 2710/1005* (2013.01); *B60Y 2200/92* (2013.01); *B60Y 2300/186* (2013.01); *B60Y 2300/48* (2013.01); *F16H 61/08* (2013.01); *F16H 2302/06* (2013.01); *F16H 2312/14* (2013.01); *Y02T 10/6252* (2013.01); *Y02T 10/642* (2013.01); *Y02T 10/70* (2013.01); *Y02T 10/7077* (2013.01)

(58) Field of Classification Search
USPC .......................................... 123/65.21–65.29
See application file for complete search history.

(56) References Cited

U.S. PATENT DOCUMENTS 8,197,384 B2 * 6/2012 Shibata ................. B60K 6/445
477/3
2011/0320076 A1 * 12/2011 Shin ........................ B60K 6/48
701/22
2012/0083952 A1 * 4/2012 Smith .................... B60K 6/442
701/22

FOREIGN PATENT DOCUMENTS

JP A-2006-306325 11/2006
JP A-2008-179235 8/2008
JP A-2011-020541 2/2011

* cited by examiner

CONTROL DEVICE FOR VEHICLE DRIVE DEVICE

TECHNICAL FIELD

The present invention relates to a control device that controls a vehicle drive device in which a disconnecting engagement device, a rotary electric machine, and a speed change mechanism are provided on a power transfer path connecting between an internal combustion engine and wheels and are arranged in this order from the internal combustion engine toward the wheels.

BACKGROUND ART

A device described in Japanese Patent Application Publication No. 2008-179235 (JP 2008-179235 A, Patent Document 1) is already known as an example of the control device that controls a vehicle drive device as described above. In the following description in the "BACKGROUND ART" section, the names of members used in Patent Document 1 are cited in brackets for description. In the control device, in switching from an EV mode to an HEV mode, one [disengagement-side shifting friction element] of a plurality of shifting engagement devices of a speed change mechanism [automatic transmission 3] is brought into a slip engagement state. In this state, a disconnecting engagement device [first clutch 6] is engaged, and the rotational speed of a rotary electric machine [motor/generator 5] is raised to a predetermined target speed to crank an internal combustion engine [engine 1]. By causing the predetermined shifting engagement device to slip in this manner, occurrence of a starting shock due to transfer of unstable torque to wheels during such switching is relieved.

As recognized in Patent Document 1, in mode switching accompanied by starting of the internal combustion engine such as that described above, a target shift speed for the speed change mechanism is occasionally changed. In the device according to Patent Document 1, after the target shift speed is changed, supply of a hydraulic pressure to another one [engagement-side shifting friction element] of the shifting engagement devices to be engaged in order to establish the target shift speed after the change is started immediately.

When supply of a hydraulic pressure to a shifting engagement device is started, however, heat is generated little by little even before the shifting engagement device is brought into a slip engagement state. Therefore, if supply of a hydraulic pressure is started immediately as described above in the case where a shifting request is made at the same time as an internal combustion engine starting request is made, heat may be generated continuously for a long time (since the shifting request is made until the rotational speed of the internal combustion engine is raised) compared to the case of normal shifting control. As a result, there arises a need to enhance the heat-resistant performance of the shifting engagement device, which may lead to an increase in size of the device and an increase in manufacturing cost. It is also conceivable to delay the timing to start supply of a hydraulic pressure with respect to a shifting request in consideration of heat generation by the shifting engagement device. In this case, it is important to appropriately decide the supply start timing. In the case where the supply start timing is not appropriate but is too late, for example, initial hydraulic pressure supply for bringing the shifting engagement device into a state immediately before it starts generating a transfer torque capacity may be insufficient. Hence, the drive force may not be raised immediately after the rotational speed of the internal combustion engine and an input-side rotary member in the speed change mechanism reaches a rotational speed matching the vehicle speed and the target shift speed after the change.

RELATED-ART DOCUMENTS

Patent Documents

[Patent Document 1] Japanese Patent Application Publication No. 2008-179235 (JP 2008-179235 A)

SUMMARY OF THE INVENTION

Problem to be Solved by the Invention

Thus, it is desired to provide a control device for a vehicle drive device capable of appropriately deciding the timing to start supply of a hydraulic pressure to a shifting engagement device to be engaged in order to establish a target shift speed after a change in the case where the target shift speed is changed during execution of internal combustion engine starting control.

Means for Solving the Problem

The present invention provides a control device that controls a vehicle drive device in which a disconnecting engagement device, a rotary electric machine, and a speed change mechanism are provided on a power transfer path connecting between an internal combustion engine and wheels and are arranged in this order from the internal combustion engine toward the wheels and the speed change mechanism switches between a plurality of shift speeds on the basis of control of respective states of engagement of a plurality of shifting engagement devices provided in the speed change mechanism. The control device is characterized by including: a starting control section that executes internal combustion engine starting control in which the internal combustion engine in a stationary state is started while causing the disconnecting engagement device to transition from a disengaged state to a direct engagement state; and a timing decision section that decides, on the basis of a rotational speed of the internal combustion engine, a supply start timing to start supply of a hydraulic pressure to a specific engagement device, which is one of the plurality of shifting engagement devices and is caused to transition from a disengaged state to a direct engagement state in order to establish a target shift speed for the speed change mechanism after a change, in the case where the target shift speed is changed during execution of the internal combustion engine starting control.

The term "disengaged state" means a state in which no rotation or torque is transferred between two engagement members engaged by the subject engagement device. It should be noted, however, that the term "disengaged state" also includes a state in which rotation or torque is transferred unintentionally by accompanying rotation of the two engagement members or the like even if the engagement device is controlled to a non-engaged state. The term "slip engagement state" means a state in which the two engagement members are engaged with each other with a difference in rotation so as to transfer torque between each other. The term "direct engagement state" means a state in which the two engagement members are engaged with each other so as to rotate together with each other.

According to the characteristic configuration, the timing to start supply of a hydraulic pressure to the specific engagement device, which is engaged in order to establish the target shift speed after the change, is decided on the basis of the rotational speed of the internal combustion engine in the case where the target shift speed is changed during execution of the internal combustion engine starting control. Here, the rotational speed of the internal combustion engine is raised to a predetermined speed when the internal combustion engine starting control or shifting control (control for changing a shift speed) is ended, and thus can be utilized as an index indicating the degree of progress of the internal combustion engine starting control and the shifting control. At this time, the timing to start supply of a hydraulic pressure to the specific engagement device can be decided appropriately on the basis of the rotational speed of the internal combustion engine which is basically continuously raised without stagnation after the starting control is started.

Here, preferably, the control device for a vehicle drive device further includes: a first required time calculation section that calculates a first required time on the basis of a current rotational speed and rotational acceleration of the internal combustion engine, the first required time being a time until the rotational speed of the internal combustion engine reaches a post-shifting synchronous rotational speed which is a rotational speed of an input-side rotary member with the target shift speed after the change matching a rotational speed of the wheels, the input-side rotary member being a rotary member in the speed change mechanism that is the closest to the internal combustion engine along the power transfer path; and a second required time calculation section that calculates a second required time which is a time since supply of a hydraulic pressure to the specific engagement device is started until the specific engagement device starts generating a transfer torque capacity, and the timing decision section compares the first required time and the second required time, and decides a timing when it is determined that the first required time has become equal to or less than the second required time as the supply start timing.

According to the configuration, the supply start timing to start supply of a hydraulic pressure to the specific engagement device can be decided appropriately in consideration of the time (first required time) until the post-shifting synchronous rotational speed, which is calculated on the basis of the rotational speed and the rotational acceleration of the internal combustion engine, is reached and the time (second required time) since supply of a hydraulic pressure to the specific engagement device is started until generation of a transfer torque capacity is started. Here, the internal combustion engine and the input-side rotary member of the speed change mechanism rotate synchronously when the rotational speed of the internal combustion engine is raised to the post-shifting synchronous rotational speed, and thus it can be considered that shifting is almost ended. Hence, it is possible to generally match the timing when shifting is ended and the timing when the specific engagement device starts generating a transfer torque capacity by determining the timing when the first required time which has been larger than the second required time becomes equal to or less than the second required time and determining the timing as the supply start timing. Thus, the drive force can be raised immediately without delay after shifting is ended.

The timing decision section preferably decides a timing when it is determined that the first required time, which is decreased gradually, has fallen within a determination range that is determined in advance and that is equal to or less than the second required time as the supply start timing.

According to the configuration, the supply start timing to start supply of a hydraulic pressure to the specific engagement device can be decided appropriately on the basis of the relationship between the determination range determined in association with the second required time and the first required time, and the drive force can be raised immediately after shifting is ended.

Preferably, the control device for a vehicle drive device further includes an achievement proportion calculation section that calculates an achievement proportion of the current rotational speed of the internal combustion engine to the post-shifting synchronous rotational speed, and the timing decision section decides the earlier one of a first supply start timing and a second supply start timing as the supply start timing, the first supply start timing being the supply start timing which is determined in accordance with a relationship between the first required time and the second required time, and the second supply start timing being a timing when it is determined that the achievement proportion has become equal to or more than a first reference proportion prescribed in advance.

In the case where the rotational speed and the rotational acceleration of the internal combustion engine are acquired through detection by a sensor or the like, for example, the rotational acceleration tends to be affected by noise or the like to be low in accuracy compared to the rotational speed. Therefore, the calculation accuracy of the first required time, which is calculated also on the basis of the rotational acceleration of the internal combustion engine, may not always be maintained at a high level. Hence, although it is ideal that the supply start timing to start supply of a hydraulic pressure to the specific engagement device is decided in accordance with the relationship between the first required time and the second required time, the decided supply start timing may not necessarily be optimum depending on the accuracy of the first required time. According to the configuration, the supply start timing to start supply of a hydraulic pressure to the specific engagement device can be decided also on the basis of the achievement proportion which is calculated on the basis of the rotational speed of the internal combustion engine which may be acquired relatively accurately.

Preferably, the control device for a vehicle drive device further includes a transfer start timing determination section that determines a torque transfer start timing which is a timing when the disconnecting engagement device starts generating a transfer torque capacity, and the timing decision section decides the supply start timing using whether the torque transfer start timing has been passed as a condition.

According to the configuration, supply of a hydraulic pressure to the specific engagement device is started after the timing when initial hydraulic pressure supply, which is performed until the disconnecting engagement device starts generating a transfer torque capacity, is ended. Hence, concurrent supply of an initial hydraulic pressure to both the disconnecting engagement device and the specific engagement device is avoided, and thus the engagement devices can be controlled stably by suppressing a reduction in supplied hydraulic pressure.

Preferably, the control device for a vehicle drive device further includes a delay control section that executes delay control, in which the rotary electric machine is controlled such that a rise in rotational speed of the internal combustion engine is delayed, until it is determined that the first required time has fallen within a determination range that is determined in advance and that is equal to or less than the second required time after the disconnecting engagement device is brought into a direct engagement state in the case where the supply start timing, which is determined in accordance with a relationship between the first required time and the second required time, is already passed at a time point when the target shift speed is changed.

In the case where the supply start timing, which is determined in accordance with the relationship between the first required time and the second required time, has already elapsed at the time point when the target shift speed is changed, supply of an initial hydraulic pressure to the specific engagement device may not be ended in time for a scheduled shifting ending timing even if supply of a hydraulic pressure to the specific engagement device is started immediately. Thus, it is possible to delay the scheduled shifting ending timing to be closer to the timing when the specific engagement device starts generating a transfer torque capacity by executing the delay control to delay a rise in rotational speed of the internal combustion engine through the rotary electric machine.

Preferably, the delay control section executes rotational speed control, in which a rotational speed of the rotary electric machine is controlled so as to approach a target rotational speed, during the delay control, compares a third required time and a remaining time until a lapse of the second required time, the third required time being a time required until an estimated rotational speed of the internal combustion engine, which is calculated on the basis of a rotational acceleration of the internal combustion engine before the delay control is started and the target rotational speed, reaches the post-shifting synchronous rotational speed, and ends the rotational speed control and raises the rotational speed of the internal combustion engine and the rotary electric machine when it is determined that the remaining time has fallen within a determination range that is determined in advance and that is equal to or less than the third required time.

According to the configuration, it is possible to effectively suppress a rise in rotational speed of the internal combustion engine in the delay control through the rotational speed control for the rotary electric machine. In addition, the timing when the rotational speed control is ended can be decided appropriately on the basis of the relationship between the determination range, which is determined in association with the remaining time until the lapse of the second required time, and the third required time with the rotational speed of the internal combustion engine and the rotary electric machine maintained around the target rotational speed for the rotational speed control for the rotary electric machine. Consequently, it is possible to generally match the timing when shifting is ended and the timing when the specific engagement device starts generating a transfer torque capacity thereafter, and to immediately raise the drive force after shifting is ended.

Preferably, the control device for a vehicle drive device further includes: a fourth required time calculation section that calculates a fourth required time on the basis of a current rotational speed and rotational acceleration of the internal combustion engine in the case where a target shift speed for the speed change mechanism is changed stepwise by way of a first target shift speed to a second target shift speed during execution of the internal combustion engine starting control, the fourth required time being a time until the rotational speed of the internal combustion engine reaches a first post-shifting synchronous rotational speed which is a rotational speed of the input-side rotary member with the first target shift speed matching a rotational speed of the wheels; a fifth required time calculation section that calculates a fifth required time for a second specific engagement device that is one of the plurality of shifting engagement devices and different from the specific engagement device and that is caused to transition from a direct engagement state by way of a slip engagement state to a disengaged state in order to establish the second target shift speed, the fifth required time being a time since start of reduction in hydraulic pressure to be supplied to the second specific engagement device until a set hydraulic pressure prescribed in advance is reached; an achievement proportion calculation section that calculates a first shifting achievement proportion which is an achievement proportion of the current rotational speed of the internal combustion engine to the first post-shifting synchronous rotational speed; and a reduction start timing decision section that decides a reduction start timing to start reduction in hydraulic pressure to be supplied to the second specific engagement device, and the reduction start timing decision section decides the earlier one of a timing when it is determined that the fourth required time has become equal to or less than the fifth required time and a timing when it is determined that the first shifting achievement proportion has become equal to or more than a second reference proportion prescribed in advance as the reduction start timing.

In the case where the target shift speed is changed stepwise from the target shift speed before the change by way of the first target shift speed to the second target shift speed during execution of the internal combustion engine starting control, it is preferable to optimize the reduction start timing to start reduction in hydraulic pressure to be supplied to the second specific engagement device which is disengaged in order to establish the second target shift speed. According to the configuration described above, the first candidate timing for the reduction start timing to start reduction in hydraulic pressure to be supplied to the second specific engagement device can be decided appropriately on the basis of the relationship between the fourth required time and the fifth required time. In addition, the second candidate timing for the reduction start timing to start reduction in hydraulic pressure to be supplied to the second specific engagement device can be decided appropriately on the basis of the relationship between the first shifting achievement proportion and the second reference proportion. Then, the reduction start timing to start reduction in hydraulic pressure to be supplied to the second specific engagement device can be decided appropriately from the two candidate timings also in consideration of the respective acquisition accuracies of the rotational speed and the rotational acceleration of the internal combustion engine.

In the present invention, by way of example, the internal combustion engine starting control may be defined as control started at a time point when a request to start the internal combustion engine is received and ended at a time point when the specific engagement device is caused to transition from a slip engagement state to a direct engagement state.

MODES FOR CARRYING OUT THE INVENTION

1. First Embodiment

Figure 1:
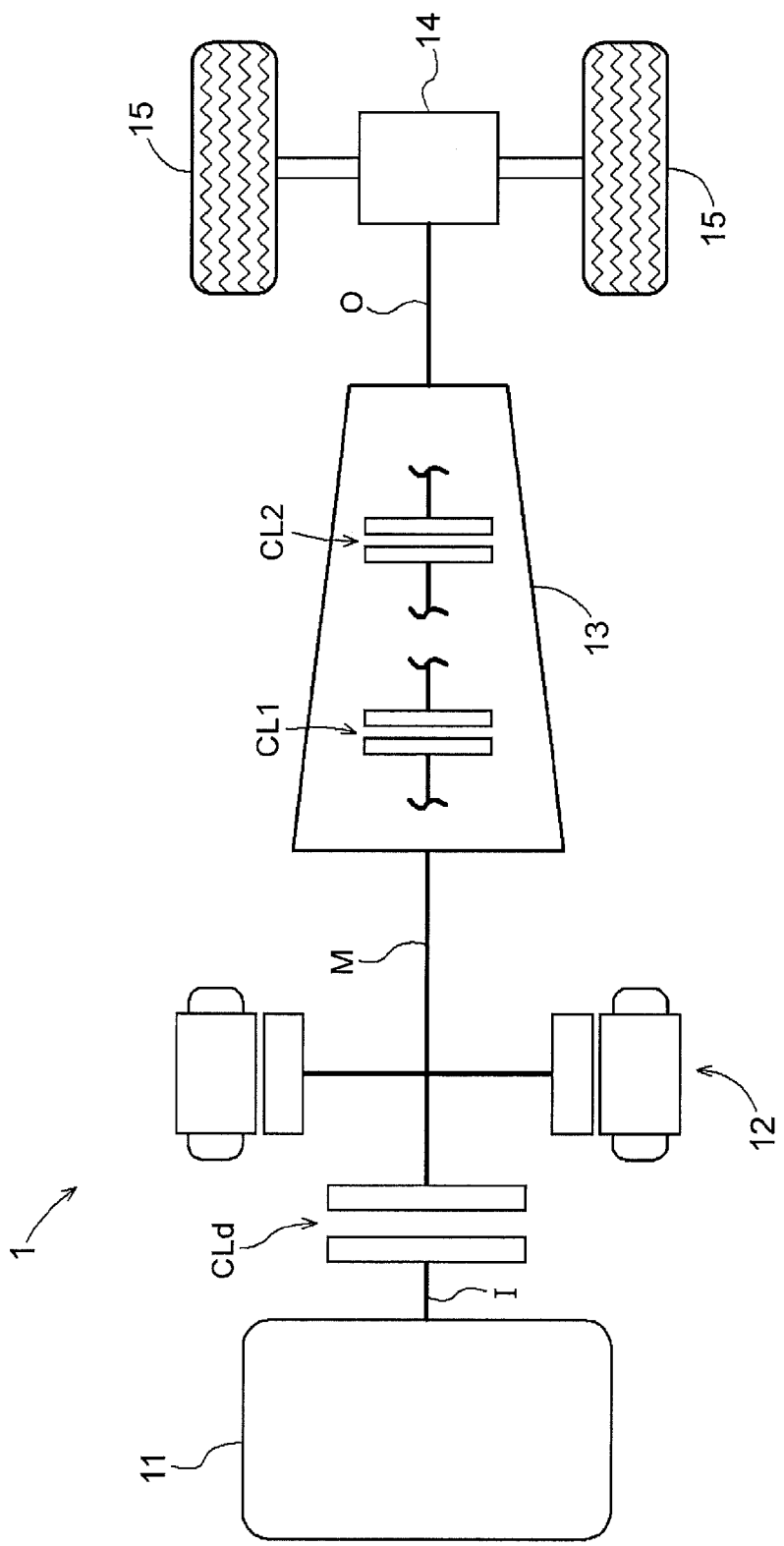
FIG. 1 is a schematic diagram illustrating a schematic configuration of a vehicle drive device.

A control device for a vehicle drive device according to a first embodiment of the present invention will be described with reference to the drawings. A control device 3 according to the embodiment controls a drive device 1. Here, the drive device 1 is a vehicle drive device (hybrid vehicle drive device) that drives a vehicle (hybrid vehicle) that includes both an internal combustion engine 11 and a rotary electric machine 12 as drive force sources for wheels 15. The control device 3 according to the embodiment will be described in detail below.

In the following description, the term "drivably coupled" means a state in which two rotary members are coupled to each other in such a way that allows transfer of a drive force (a synonym of torque), which includes a state in which the two rotary members are coupled to each other so as to rotate together with each other, and a state in which the two rotary members are coupled to each other via one or more transmission members (such as a shaft, a gear mechanism, and a belt) in such a way that allows transfer of a drive force.

The term "engagement pressure" refers to a pressure at which two engagement members are pressed against each other to be engaged in an engagement device. The term "disengagement pressure" refers to a pressure at which an engagement device is steadily brought into a disengaged state. The term "disengagement boundary pressure" refers to a pressure (disengagement-side slip boundary pressure) at which an engagement device is brought into a boundary state between the disengaged state and a slip engagement state (in which the engagement device is in slip engagement). The term "engagement boundary pressure" refers to a pressure (engagement-side slip boundary pressure) at which an engagement device is brought into a boundary state between the slip engagement state and a direct engagement state (in which the engagement device is in direct engagement). The term "complete engagement pressure" refers to a pressure at which an engagement device is steadily brought into the direct engagement state.

1-1. Configuration of Drive Device

The configuration of the drive device 1 to be controlled by the control device 3 will be described. As illustrated in FIG. 1, the drive device 1 according to the embodiment includes the rotary electric machine 12 provided on a power transfer path connecting between the internal combustion engine 11 and the wheels 15, a disconnecting engagement device CLd provided between the internal combustion engine 11 and the rotary electric machine 12, and a speed change mechanism 13 provided between the rotary electric machine 12 and the wheels 15. That is, the drive device 1 includes the disconnecting engagement device CLd, the rotary electric machine 12, and the speed change mechanism 13, which are provided on the power transfer path connecting between the internal combustion engine 11 and the wheels 15 and which are arranged in this order from the internal combustion engine 11 toward the wheels 15. Such components are housed in a drive device case (not illustrated).

The internal combustion engine 11 is a motor (such as a gasoline engine) driven by combusting fuel inside the engine to take out power. The internal combustion engine 11 is drivably coupled to an input shaft I serving as an input member of the drive device 1. In the example, an internal combustion engine output shaft, such as a crankshaft of the internal combustion engine 11, is drivably coupled so as to rotate together with the input shaft I. The internal combustion engine 11 is drivably coupled to the rotary electric machine 12 via the disconnecting engagement device CLd.

The disconnecting engagement device CLd is an engagement device that selectively drivably couples the internal combustion engine 11 and the rotary electric machine to each other. The disconnecting engagement device CLd can release drivable coupling between the internal combustion engine 11 and the rotary electric machine 12 in the disengaged state. The disconnecting engagement device CLd functions as an internal combustion engine-disconnecting engagement device that disengages the internal combustion engine 11 from the wheels 15, the rotary electric machine 12, and so forth. A wet multi-plate clutch, a dry single-plate clutch, or the like may be used as the disconnecting engagement device CLd. The disconnecting engagement device CLd is structured as a friction engagement device that can transfer torque using a friction force generated between engagement members that are engaged with each other.

The rotary electric machine 12 is structured to include a rotor and a stator (not illustrated), and can function both as a motor (electric motor) and as a generator (electric generator). The rotor of the rotary electric machine 12 is drivably coupled so as to rotate together with a transmission input shaft M. The rotary electric machine 12 is electrically connected to an electricity accumulation device 25 (such as a battery or a capacitor) via an inverter device 24 (see FIG. 2). The rotary electric machine 12 receives electric power supplied from the electricity accumulation device 25 for power running, or supplies electric power generated using torque of the internal combustion engine 11 or the like to the electricity accumulation device 25 to accumulate the electric power in the electricity accumulation device 25. The transmission input shaft M is drivably coupled to the speed change mechanism 13, and serves as a rotary member in the speed change mechanism 13 that is the closest to the internal combustion engine 11 along the power transfer path. In the embodiment, the transmission input shaft M corresponds to the "input-side rotary member" according to the present invention.

In the embodiment, the speed change mechanism 13 is a stepped automatic transmission that enables switching between a plurality of shift speeds with different speed ratios (gear ratios). In order to establish the plurality of shift speeds, the speed change mechanism 13 includes a gear mechanism and a plurality of shifting engagement devices that engage and disengage a rotary element of the gear mechanism. The shifting engagement devices are each structured as a friction engagement device. A wet multi-plate clutch (or brake) or the like may be used as the shifting engagement devices. The shifting engagement devices of the speed change mechanism 13 include a first engagement device CL1, a second engagement device CL2, a third engagement device, a fourth engagement device, etc. In the embodiment, the speed change mechanism 13 establishes a target shift speed at each time point by bringing specific two of the plurality of shifting engagement devices into the direct engagement state and bringing the other shifting engagement devices into the disengaged state. The speed change mechanism 13 may be configured to establish the target shift speed by bringing a specific one or specific three or more of the plurality of shifting engagement devices into the direct engagement state. This enables the speed change mechanism 13 to switch between the plurality of shift speeds on the basis of control of the respective states of engagement of the plurality of shifting engagement devices.

The speed change mechanism 13 transfers rotation of the transmission input shaft M to an output shaft O with the speed of the rotation changed on the basis of a speed ratio set for the established shift speed. Here, the speed ratio indicates the ratio of the rotational speed of the transmission input shaft M to the rotational speed of the output shaft O which serves as an output-side rotary member of the speed change mechanism. The output shaft O, which also serves as an output member of the drive device 1, is drivably coupled to the two, left and right, wheels 15 via a differential gear device 14. Torque transferred to the output shaft O is distributed by the differential gear device 14 to be transferred to the two wheels 15. This allows the drive device 1 to transfer torque of one or both of the internal combustion engine 11 and the rotary electric machine 12 to the wheels 15 to drive the vehicle.

1-2. Configuration of Control Device

Figure 2:
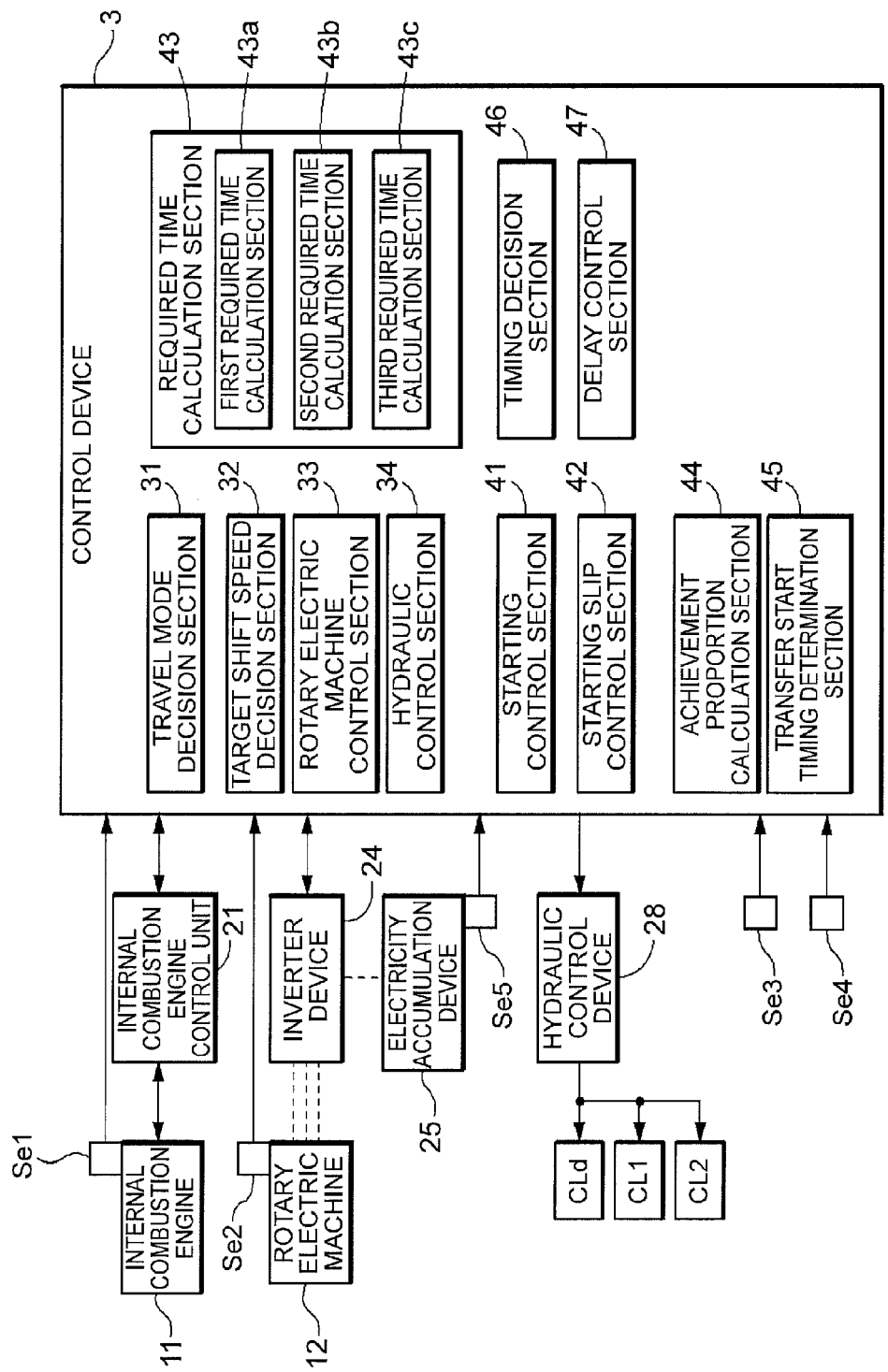
FIG. 2 is a block diagram illustrating a schematic configuration of a control device according to a first embodiment.

The configuration of the control device 3 according to the embodiment will be described. As illustrated in FIG. 2, the control device 3 according to the embodiment includes a plurality of functional sections, and mainly controls the rotary electric machine 12, the disconnecting engagement device CLd, and the shifting engagement devices (CL1, CL2, etc.). The plurality of functional sections are configured to exchange information between each other. The control device 3 is configured to exchange information with an internal combustion engine control unit 21 that controls the internal combustion engine 11. The control device 3 is configured to acquire information on the results of detection by sensors Se1 to Se5 provided to various portions of the vehicle.

The first rotation sensor Se1 is a sensor that detects the rotational speed of the internal combustion engine 11 (input shaft I). The control device 3 can derive the rotational acceleration of the internal combustion engine 11 on the basis of the results of detection by the first rotation sensor Se1. The second rotation sensor Se2 is a sensor that detects the rotational speed of the rotor of the rotary electric machine 12 (transmission input shaft M). The third rotation sensor Se3 is a sensor that detects the rotational speed of the output shaft O. The control device 3 can derive the rotational speed of the wheels 15 and the vehicle speed on the basis of the results of detection by the third rotation sensor Se3. The accelerator operation amount detection sensor Se4 is a sensor that detects the accelerator operation amount. The charge state detection sensor Se5 is a sensor that detects the state of charge (SOC). The control device 3 can derive the amount of electric power accumulated in the electricity accumulation device 25 on the basis of the results of detection by the charge state detection sensor Se5.

The internal combustion engine control unit 21 controls the internal combustion engine 11. The internal combustion engine control unit 21 decides target torque and a target rotational speed for the internal combustion engine 11, and controls operation of the internal combustion engine 11 in accordance with such control targets. In the embodiment, the internal combustion engine control unit 21 can switch control for the internal combustion engine 11 between torque control and rotational speed control in accordance with the travel state of the vehicle. In the torque control, a command for the target torque is provided to the internal combustion engine 11 to cause torque of the internal combustion engine 11 to follow the target torque. In the rotational speed control, a command for the target rotational speed is provided to the internal combustion engine 11 to decide torque such that the rotational speed of the internal combustion engine 11 approaches the target rotational speed.

A travel mode decision section 31 is a functional section that decides a travel mode of the vehicle. The travel mode decision section 31 references a mode selection map (not illustrated), for example, and decides the travel mode to be achieved by the drive device 1 on the basis of the vehicle speed, the accelerator operation amount, the amount of electric power accumulated in the electricity accumulation device 25, or the like. In the embodiment, examples of the travel mode that can be selected by the travel mode decision section 31 include an electric travel mode (EV mode) and a hybrid travel mode (HEV mode). In the electric travel mode, the disconnecting engagement device CLd is brought into the disengaged state, and the vehicle is driven with torque of the rotary electric machine 12 transferred to the wheels 15. In the hybrid travel mode, the disconnecting engagement device CLd is brought into the direct engagement state, and the vehicle is driven with torque of both the internal combustion engine 11 and the rotary electric machine 12 transferred to the wheels 15. Travel modes other than such travel modes may be selected.

A target shift speed decision section 32 is a functional section that decides the target shift speed. The target shift speed decision section 32 references a speed change map (not illustrated), for example, and decides the target shift speed to be established by the speed change mechanism 13 on the basis of the vehicle speed, the accelerator operation amount, or the like.

A rotary electric machine control section 33 is a functional section that controls the rotary electric machine 12. The rotary electric machine control section 33 decides target torque and a target rotational speed for the rotary electric machine 12, and controls operation of the rotary electric machine 12 in accordance with such control targets. In the embodiment, the rotary electric machine control section 33 can switch control for the rotary electric machine 12 between torque control and rotational speed control in accordance with the travel state of the vehicle. In the torque control, a command for the target torque is provided to the rotary electric machine 12 to cause torque of the rotary electric machine 12 to follow the target torque. In the rotational speed control, a command for the target rotational speed is provided to the rotary electric machine 12 to decide torque such that the rotational speed of the rotary electric machine 12 approaches the target rotational speed.

A hydraulic control section 34 is a functional section that controls supply of a hydraulic pressure to the engagement devices (CLd, CL1, CL2, etc.). The hydraulic control section 34 outputs a hydraulic pressure command to the engagement devices in accordance with the decided travel mode, the target shift speed, or the like, and controls a hydraulic pressure to be supplied to the engagement devices via a hydraulic control device 28. The hydraulic control section 34 can continuously control the hydraulic pressure to be supplied to the engagement devices in accordance with the hydraulic pressure command using a proportional solenoid or the like. This allows continuously controlling increase and decrease in engagement pressure of the engagement devices to control the respective states of engagement of the engagement devices. For example, the hydraulic control section 34 makes the hydraulic pressure to be supplied to an engagement device to be controlled (subject engagement device) less than the disengagement boundary pressure to bring the subject engagement device into the disengaged state. Meanwhile, the hydraulic control section 34 makes the hydraulic pressure to be supplied to the subject engagement device equal to or more than the engagement boundary pressure to bring the subject engagement device into the direct engagement state. In addition, the hydraulic control section 34 makes the hydraulic pressure to be supplied to the subject engagement device equal to or more than the disengagement boundary pressure and less than the engagement boundary pressure to bring the subject engagement device into the slip engagement state.

When the subject engagement device is in the slip engagement state, torque is transferred from an engagement member at a higher rotational speed to an engagement member at a lower rotational speed with the two engagement members rotatable relative to each other. The magnitude of torque that can be transferred with the subject engagement device in the engaged state (a state including both the direct engagement state and the slip engagement state) is decided in accordance with the hydraulic pressure to be supplied to the subject engagement device at the time point (the engagement pressure of the subject engagement device). The magnitude of torque at this time is defined as the transfer torque capacity of the subject engagement device. The transfer torque capacity of the engagement devices may be continuously controlled in accordance with increase and decrease in supplied hydraulic pressure.

The starting control section 41 is a functional section that executes internal combustion engine starting control. The starting control section 41 executes the internal combustion engine starting control by cooperatively controlling the rotary electric machine control section 33 and the hydraulic control section 34. The starting control section 41 starts the internal combustion engine starting control in the case where internal combustion engine start conditions are met during travel in the electric travel mode, for example. The internal combustion engine start conditions are conditions for starting the internal combustion engine 11 in a stationary state, and are met in the case where the vehicle requires torque of the internal combustion engine 11. For example, the internal combustion engine start conditions are met in the case where torque necessary to drive the vehicle may not be obtained from only torque of the rotary electric machine 12 during travel in the electric travel mode.

Figure 3:
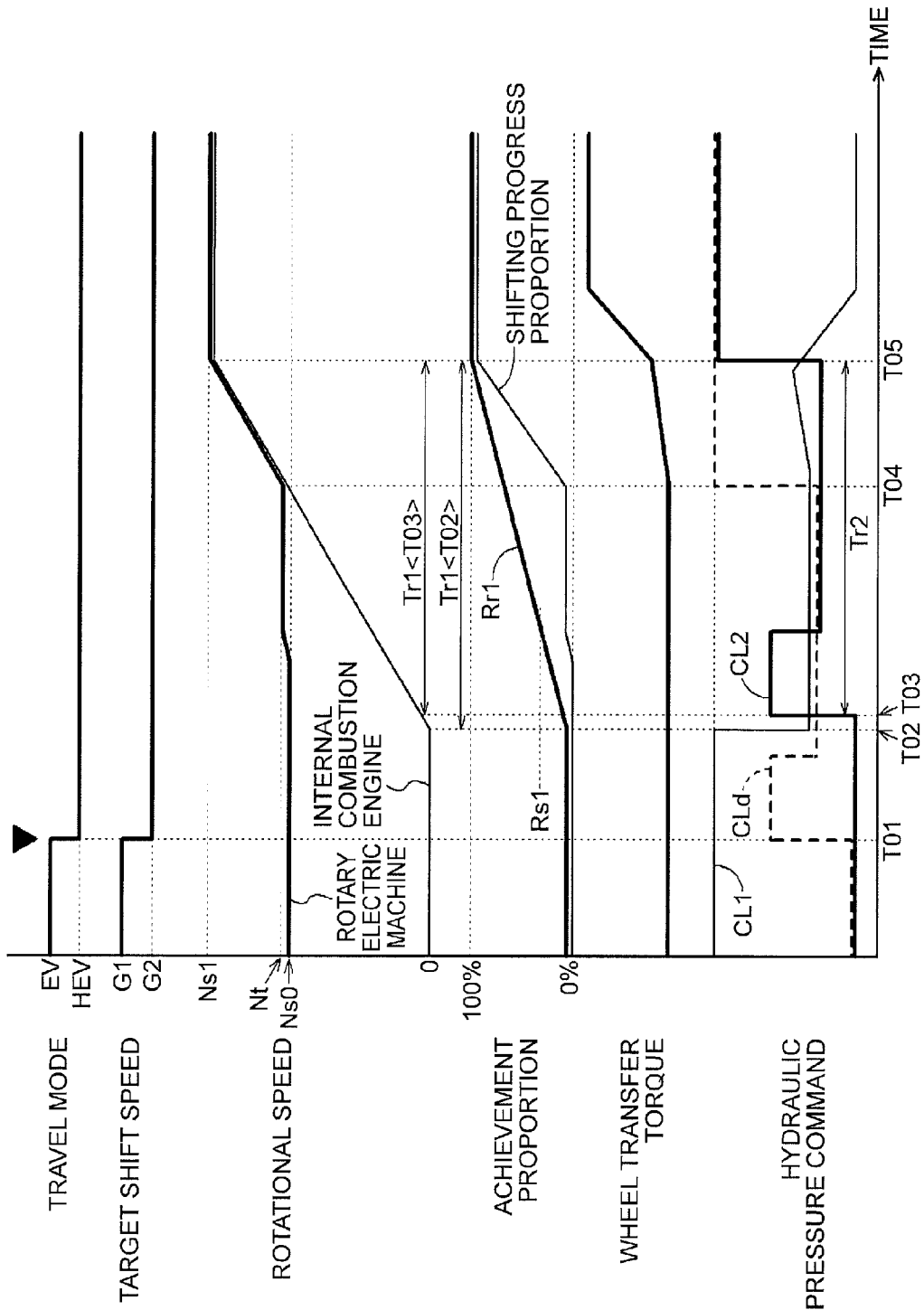
FIG. 3 is a time chart illustrating an example of an operating state of various components during a hydraulic pressure supply start timing decision process.

In the internal combustion engine starting control, the starting control section 41 controls the hydraulic pressure to be supplied to the disconnecting engagement device CLd to bring the disconnecting engagement device CLd from the disengaged state, by way of the slip engagement state, and finally to the direct engagement state as also illustrated in FIG. 3 etc. The starting control section 41 concurrently executes the rotational speed control for the rotary electric machine 12, and starts the internal combustion engine 11 in the stationary state using torque of the rotary electric machine 12 transferred via the disconnecting engagement device CLd in the slip engagement state. In this way, the starting control section 41 executes the internal combustion engine starting control to start the internal combustion engine 11 in the stationary state while causing the disconnecting engagement device CLd to transition from the disengaged state to the slip engagement state or the direct engagement state.

A starting slip control section 42 is a functional section that executes starting slip control in the internal combustion engine starting control. The starting slip control section 42 executes the starting slip control by controlling the hydraulic control section 34. The starting slip control section 42 controls a hydraulic pressure to be supplied to the first engagement device CL1, which is one of the plurality of shifting engagement devices and which has been brought into the direct engagement state when the internal combustion engine start conditions are met, to cause the first engagement device CL1 to transition from the direct engagement state to the slip engagement state. The starting slip control section 42 causes the first engagement device CL1 to transition to the slip engagement state at a predetermined timing while the disconnecting engagement device CLd is brought into the slip engagement state or the direct engagement state. Here, the starting slip control section 42 brings the first engagement device CL1 into the slip engagement state at least when the disconnecting engagement device CLd is in the direct engagement state. Such slip control for the first engagement device CL1 allows the rotational speed control for the rotary electric machine 12 to be executed appropriately during the internal combustion engine starting control. In addition, occurrence of a starting shock due to transfer of unstable torque accompanied by starting of the internal combustion engine 11 to the wheels 15 can be relieved.

The starting slip control section 42 normally causes the first engagement device CL1 to transition from the slip engagement state to the direct engagement state again at a predetermined timing after the internal combustion engine 11 is started and the disconnecting engagement device CLd is brought into the direct engagement state. In the case where the target shift speed for the speed change mechanism 13 is changed during execution of the internal combustion engine starting control, the starting slip control section 42 causes the first engagement device CL1 to finally transition to the disengaged state, and causes the second engagement device CL2 of the speed change mechanism 13 from the disengaged state, by way of the slip engagement state, to the direct engagement state (see FIG. 3 etc.). In the embodiment, the second engagement device CL2 corresponds to the "specific engagement device" according to the present invention. At the time point when the first engagement device CL1 or the second engagement device CL2 is brought into the direct engagement state, the internal combustion engine starting control and the starting slip control are ended.

In this way, the internal combustion engine starting control is started at the time point when an internal combustion engine starting request (indicated by the inverted black triangle in FIG. 3 etc.), and ended at the time point when the first engagement device CL1 or the second engagement device CL2 transitions from the slip engagement state to the direct engagement state in accordance with the presence or absence of a change in target shift speed.

In such a configuration, the control device 3 according to the embodiment is characterized in that the timing to start supply of a hydraulic pressure to the second engagement device CL2 of the speed change mechanism 13 is decided on the basis of the rotational speed of the internal combustion engine 11, rather than the proportion of progress of shifting which is commonly used, in the case where the target shift speed is changed during execution of the internal combustion engine starting control. This will be described in detail below also with reference to the time charts of FIGS. 3 and 4 as appropriate.

In the embodiment, an example in which the target shift speed is changed by one step (changed from G1 to G2) is assumed. In the assumed example, in order to establish the target shift speed after the change, the first engagement device CL1, which is brought into the slip engagement state during the starting slip control, is caused to transition to the disengaged state, and the second engagement device CL2 is caused to transition from the disengaged state to the direct engagement state. In the following description, the rotational speed of the transmission input shaft M matching the vehicle speed (which is proportional to the rotational speed of the wheels 15 and the output shaft O) with the target shift speed before the change is defined as a pre-shifting synchronous rotational speed Ns0, and the rotational speed of the transmission input shaft M matching the vehicle speed with the target shift speed after the change is defined as a post-shifting synchronous rotational speed Ns1. The proportion of progress of shifting described above is the proportion of progress of a process in which the rotational speed of the transmission input shaft M is brought from the pre-shifting synchronous rotational speed Ns0 to the post-shifting synchronous rotational speed Ns1, and is a speed change mechanism-based shifting progress proportion based on the rotational speed of the transmission input shaft M which is the input-side rotary member of the speed change mechanism 13.

A required time calculation section 43 is a functional section that calculates the time required to achieve a variety of events determined in advance. In the embodiment, as illustrated in FIG. 2, the required time calculation section 43 includes at least a first required time calculation section 43a and a second required time calculation section 43b.

The first required time calculation section 43a calculates a first required time Tr1, which is taken until the rotational speed of the internal combustion engine 11 reaches the post-shifting synchronous rotational speed Ns1, on the basis of the current (at the time point) rotational speed and rotational acceleration of the internal combustion engine 11. Information on the rotational speed of the internal combustion engine 11 can be acquired by the first rotation sensor Se1. Information on the rotational acceleration of the internal combustion engine 11 can be derived on the basis of the results of detection by the first rotation sensor Se1 (through differential computation, for example). A sensor that detects the rotational acceleration of the internal combustion engine 11 may be provided separately from the first rotation sensor Se1, and information on the rotational acceleration of the internal combustion engine 11 may be acquired by the sensor. The first required time calculation section 43a calculates the first required time Tr1 by dividing the difference between the post-shifting synchronous rotational speed Ns1 and the rotational speed of the internal combustion engine at the time point by the rotational acceleration at the time point. In FIG. 3, by way of example, the first required times Tr1 at times T02 and T03 are indicated as Tr1<T02> and Tr1<T03>, respectively. In the embodiment, in order to simplify the following description, the rotational acceleration of the internal combustion engine 11 is kept at a constant value (the rotational speed of the internal combustion engine 11 is varied at a constant variation rate).

The second required time calculation section 43b calculates a second required time Tr2, which is taken since supply of a hydraulic pressure to the second engagement device CL2 is started until the second engagement device CL2 starts generating a transfer torque capacity. In general, the engagement devices including the second engagement device CL2 each include a hydraulic servo mechanism having a piston and a cylinder, and a plurality of friction plates that are pressed by the piston to be engaged with each other. The engagement devices do not generate a transfer torque capacity immediately after a hydraulic pressure is supplied, but start generating a transfer torque capacity only after a pack clearance between the friction plates is eliminated. Here, drag torque generated between the friction plates at an engagement pressure of zero is neglected. The time required for initial hydraulic pressure supply (precharge), which is taken until generation of a transfer torque capacity is started, may be different among the engagement devices. Even for the same engagement device, the required time may be different in accordance with the oil temperature or the like. The required time is calculated through preliminary experiments or the like, and stored in advance in the form of a map or the like, for example, in the control device 3. The second required time calculation section 43b calculates the second required time Tr2 for the second engagement device CL2 in accordance with the oil temperature at the time point or the like. The term "calculate" as used herein may include the concept of the term "acquire" with reference to a map or the like.

An achievement proportion calculation section 44 is a functional section that calculates an achievement proportion Rr1 of the current (at the time point) rotational speed of the internal combustion engine 11 to the post-shifting synchronous rotational speed Ns1. Information on the rotational speed of the internal combustion engine 11 can be acquired by the first rotation sensor Se1. The post-shifting synchronous rotational speed Ns1 can be derived on the basis of the results of detection by the third rotation sensor Se3 (through proportional computation, for example). The achievement proportion calculation section 44 calculates the achievement proportion Rr1 at the time point by dividing the rotational speed of the internal combustion engine 11 at the time point by the post-shifting synchronous rotational speed Ns1. The achievement proportion Rr1 calculated in this way can be grasped as a concept indicating an internal combustion engine-based shifting progress proportion, which is based on the rotational speed of the internal combustion engine 11.

A transfer start timing determination section 45 is a functional section that determines a torque transfer start timing, which is the timing when the disconnecting engagement device CLd starts generating a transfer torque capacity, in the internal combustion engine starting control. The transfer start timing determination section 45 determines the torque transfer start timing using whether a predetermined determination time has elapsed since supply of a hydraulic pressure to the disconnecting engagement device CLd is started as a first condition. The time required for initial hydraulic pressure supply, which is taken until the disconnecting engagement device CLd starts generating a transfer torque capacity, can be calculated in advance through preliminary experiments or the like. Thus, by adding a predetermined margin to the required time calculated in this way to set the determination time, the torque transfer start timing of the disconnecting engagement device CLd can be determined on the basis of the lapse of the determination time.

In addition, the transfer start timing determination section 45 determines the torque transfer start timing using whether torque of the rotary electric machine 12 under the rotational speed control has been raised as a second condition. Further, the transfer start timing determination section 45 determines the torque transfer start timing using whether the rotational speed of the internal combustion engine 11 has become more than zero as a third condition. When transfer of torque via the disconnecting engagement device CLd is started, torque of the rotary electric machine 12 is raised so as to maintain the target rotational speed against load torque of the internal combustion engine 11 in the stationary state. Then, the internal combustion engine 11 which has been in the stationary state is started. Thus, the torque transfer start timing can be determined on the basis of torque of the rotary electric machine 12 and the rotational speed of the internal combustion engine 11 by monitoring torque of the rotary electric machine 12 and the rotational speed of the internal combustion engine 11. In the embodiment, the transfer start timing determination section 45 determines the earliest timing when any of the three conditions described above is met as the torque transfer start timing.

A timing decision section 46 is a functional section that decides, on the basis of at least the rotational speed of the internal combustion engine 11, the timing to start supply of a hydraulic pressure to the second engagement device CL2 to be engaged in order to establish the target shift speed after the change in the case where the target shift speed is changed during execution of the internal combustion engine starting control. The timing decision section 46 decides the timing to start supply of a hydraulic pressure to the second engagement device CL2 on the basis of the results of calculation by the first required time calculation section 43a, the second required time calculation section 43b, and the achievement proportion calculation section 44 discussed above. In addition, the timing decision section 46 decides the timing to start supply of a hydraulic pressure to the second engagement device CL2 also on the basis of the results of determination by the transfer start timing determination section 45 discussed above.

The timing decision section 46 decides the timing to start supply of a hydraulic pressure to the second engagement device CL2 using whether the torque transfer start timing of the disconnecting engagement device CLd has been passed as a condition. That is, supply of a hydraulic pressure to the second engagement device CL2 is prohibited before determination of the torque transfer start timing of the disconnecting engagement device CLd, and permitted only after it is determined that the torque transfer start timing has been passed. After the torque transfer start timing of the disconnecting engagement device CLd is determined, the timing decision section 46 specifically decides the timing to start supply of a hydraulic pressure to the second engagement device CL2 as described below.

The timing decision section 46 decides a first candidate timing (first supply start timing) for the timing to start supply of a hydraulic pressure to the second engagement device CL2 in accordance with the relationship between the first required time Tr1 and the second required time Tr2. The timing decision section 46 compares the first required time Tr1 and the second required time Tr2, and decides the timing when it is determined that the first required time Tr1 has become equal to or less than the second required time Tr2 as the first supply start timing. Here, while the first required time Tr1 is decreased gradually along with the lapse of time during execution of the internal combustion engine starting control, the second required time Tr2 is kept generally constant. Thus, the timing decision section 46 preferably decides the timing when it is determined that the first required time Tr1, which is decreased gradually, has fallen within a determination range (range of (Tr2−α) or more and Tr2 or less) that is determined in advance and that is equal to or less than the second required time Tr2 as the first supply start timing.

In addition, the timing decision section 46 decides a second candidate timing (second supply start timing) for the timing to start supply of a hydraulic pressure to the second engagement device CL2 in accordance with the relationship between the achievement proportion Rr1 and a first reference proportion Rs1 prescribed in advance. The first reference proportion Rs1 is calculated empirically through preliminary experiments or the like, and preferably set to such a value that the second supply start timing is relatively close to the first supply start timing and arrives later than the first supply start timing. The first reference proportion Rs1 may be set to different values among the engagement devices in the range of 10 [%] to 40 [%], for example. The first reference proportion Rs1 may be set to different values in accordance with the oil temperature and the vehicle speed. The first reference proportion Rs1 is stored in advance in the form of a map or the like, for example, in the control device 3. The timing decision section 46 compares the achievement proportion Rr1 and the first reference proportion Rs1, and decides the timing when it is determined that the achievement proportion Rr1 has become equal to or more than the first reference proportion Rs1 as the second supply start timing. The timing decision section 46 preferably decides the timing when it is determined that the achievement proportion Rr1, which is raised gradually, has fallen within a determination range that is determined in advance and that is equal to or more than the first reference proportion Rs1 as the second supply start timing.

Then, the timing decision section 46 finally decides the earlier one of the first supply start timing and the second supply start timing as the timing to start supply of a hydraulic pressure to the second engagement device CL2.

If supply of a hydraulic pressure to the second engagement device CL2 is started at the first supply start timing, it is possible to generally match the timing when the rotational speed of the internal combustion engine 11 reaches the post-shifting synchronous rotational speed Ns1 and the timing when the second engagement device CL2 starts generating a transfer torque capacity thereafter as also illustrated in FIG. 3. In other words, it is possible to generally match the timing when shifting (here, in particular, the inertia phase) is ended and the timing when the second engagement device CL2 starts generating a transfer torque capacity. Thus, the drive force can be raised immediately without delay after shifting is ended.

Here, the rotational acceleration of the internal combustion engine 11, which is derived on the basis of the results of detection by the first rotation sensor Se1, tends to be affected by noise or the like to be low in accuracy compared to the rotational speed. Therefore, the calculation accuracy of the first required time Tr1, which is calculated also on the basis of the rotational acceleration of the internal combustion engine 11, may not always be maintained at a high level. Hence, the first supply start timing may not necessarily be the optimum depending on the accuracy of the first required time Tr1. On the other hand, the acquisition accuracy of the rotational speed of the internal combustion engine 11 is relatively high, and thus the calculation accuracy of the achievement proportion Rr1 is also relatively high. Even in the case where the calculation accuracy of the first required time Tr1 is low and the determination of the first supply start timing is delayed, it is possible to bring the timing when shifting is ended and the timing when the second engagement device CL2 starts generating a transfer torque capacity closer to each other if supply of a hydraulic pressure to the second engagement device CL2 is started at the second supply start timing. Thus, the drive force can be raised relatively immediately after shifting is ended.

Figure 4:
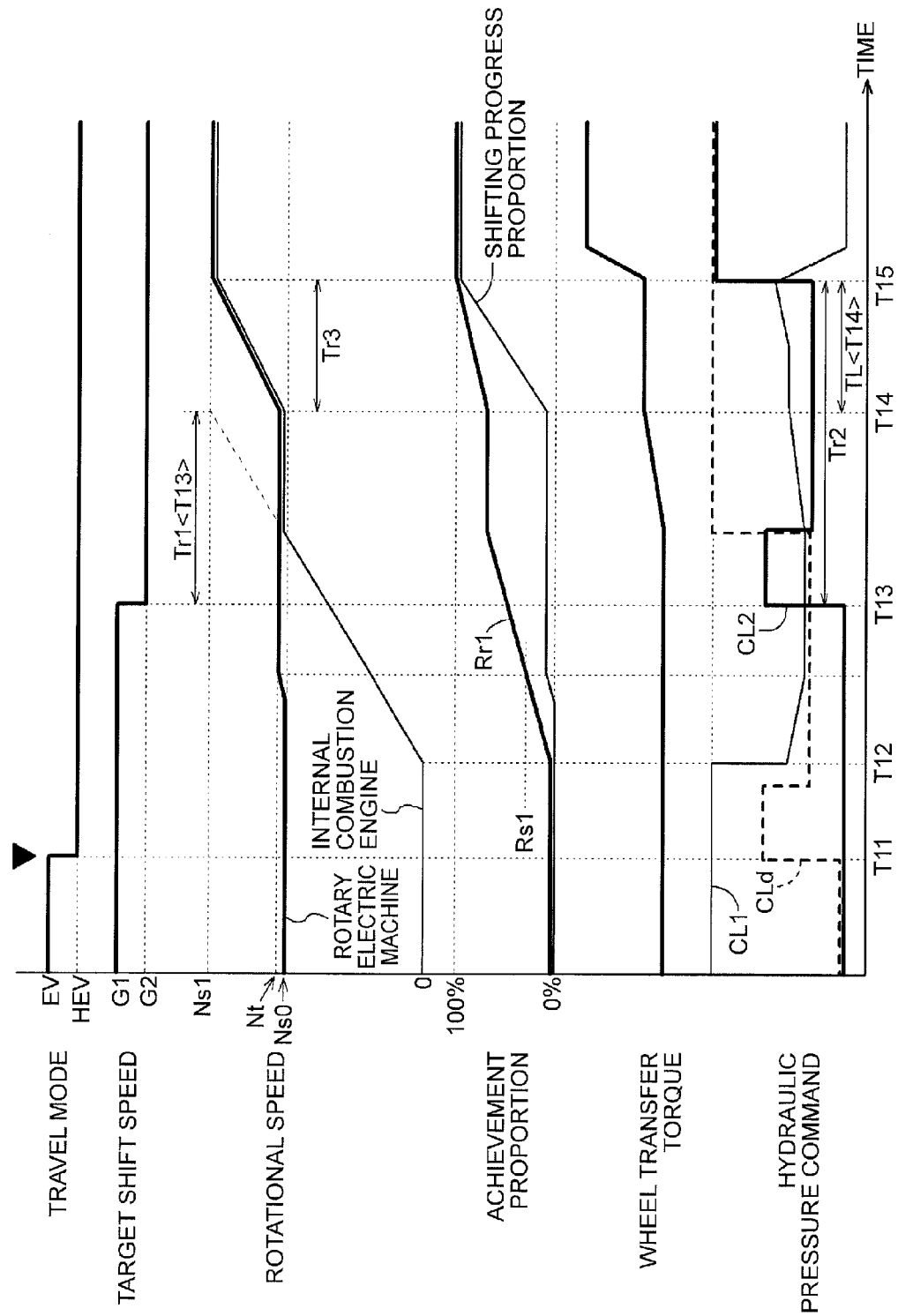
FIG. 4 is a time chart illustrating an example of an operating state of the various components during a delay control process.

Depending on the timing when the target shift speed is changed, the first supply start timing, which is determined in accordance with the relationship between the first required time Tr1 and the second required time Tr2, may be already passed at the time point of the change (time T13) as illustrated in FIG. 4. In such a case, supply of an initial hydraulic pressure to the second engagement device CL2 may not be ended in time for a scheduled shifting ending timing even if supply of a hydraulic pressure to the second engagement device CL2 is started immediately after the target shift speed is changed. As measures against such an issue, the control device 3 according to the embodiment further includes a delay control section 47.

The delay control section 47 is a functional section that executes delay control in which the rotary electric machine 12 is controlled so as to delay a rise in rotational speed of the internal combustion engine 11 after the disconnecting engagement device CLd is brought into the direct engagement state. The delay control section 47 executes the delay control with the disconnecting engagement device CLd in the direct engagement state after the internal combustion engine 11 and the rotary electric machine 12 are synchronized with each other through execution of the internal combustion engine starting control. During the delay control, the delay control section 47 executes rotational speed control for the rotary electric machine 12 by controlling the rotary electric machine control section 33. Then, the rotary electric machine 12 is controlled such that the rotational speed of the rotary electric machine 12 is brought closer to a target rotational speed Nt set to a predetermined speed that is higher than the pre-shifting synchronous rotational speed Ns0 and that is less than the post-shifting synchronous rotational speed Ns1. This makes it possible to maintain the rotational speed of the internal combustion engine 11, which rotates in synchronization with the rotary electric machine 12 via the disconnecting engagement device CLd in the direct engagement state, around the target rotational speed Nt, and to delay a rise in rotational speed of the internal combustion engine 11 to delay the scheduled shifting ending timing. The delay control section 47 executes the delay control until a delay control ending timing decided as described below.

The delay control section 47 decides the delay control ending timing in accordance with the relationship between a third required time Tr3 and a remaining time TL until the lapse of the second required time Tr2. Here, the remaining time TL until the lapse of the second required time Tr2 can be calculated on the basis of the second required time Tr2 and the elapsed time since supply of a hydraulic pressure to the second engagement device CL2 is started as the difference between the second required time Tr2 and the elapsed time. In FIG. 4, by way of example, the remaining time TL at time T14 is indicated as TL<T14>. In the embodiment, in addition, the required time calculation section 43 further includes a third required time calculation section 43c in order to calculate the third required time Tr3.

The third required time calculation section 43c calculates the third required time Tr3 which is taken until an estimated rotational speed of the internal combustion engine 11, which is calculated on the basis of the rotational acceleration of the internal combustion engine 11 before the delay control is started and the target rotational speed Nt in the rotational speed control for the rotary electric machine 12, reaches the post-shifting synchronous rotational speed Ns1. The third required time calculation section 43c calculates the third required time Tr3 by dividing the difference between the post-shifting synchronous rotational speed Ns1 and the target rotational speed Nt by the rotational acceleration of the internal combustion engine 11 before the delay control is started. Here, information on the rotational acceleration of the internal combustion engine 11 before the delay control is started is used because it can be considered that after the delay control is canceled, the rotational speed of the internal combustion engine 11 is varied at a rotational acceleration that is about the same as the rotational acceleration before the delay control is started.

The delay control section 47 compares the third required time Tr3 and the remaining time TL until the lapse of the second required time Tr2, and decides the timing when it is determined that the remaining time TL has become equal to or less than the third required time Tr3 as the delay control ending timing. Here, while the remaining time TL is decreased gradually along with the lapse of time during execution of the delay control, the first required time Tr1 is kept generally constant. Thus, the delay control section 47 preferably decides the timing when it is determined that the remaining time TL, which is decreased gradually, has fallen within a determination range (range of (Tr1−β) or more and Tr1 or less) that is determined in advance and that is equal to or less than the first required time Tr1 as the delay control ending timing.

When the delay control ending timing decided as described above is reached, the delay control section 47 ends the delay control and the rotational speed control for the rotary electric machine 12 accompanying the delay control. This allows the rotational speed of the internal combustion engine 11 and the rotary electric machine 12, which rotate in synchronization with each other, to be raised at a rotational acceleration that is about the same as the rotational acceleration of the internal combustion engine 11 before the delay control is started. If the delay control is ended at such a timing, it is possible to generally match the timing when the rotational speed of the internal combustion engine 11 reaches the post-shifting synchronous rotational speed Ns1 (timing when shifting is ended) and the timing when the second engagement device CL2 starts generating a transfer torque capacity thereafter as also illustrated in FIG. 4. Hence, the drive force can be raised immediately after shifting is ended. In addition, the difference in rotation between the two engagement members of the first engagement device CL1 in the slip engagement state can be reduced compared to a case where the delay control (the rotational speed control for the rotary electric machine 12) is not executed. Hence, the amount of heat generated by the first engagement device CL1 can advantageously be suppressed to be small.

1-3. Process Procedure of Hydraulic Pressure Supply Start Timing Decision Process The process procedure of the hydraulic pressure supply start timing decision process according to the embodiment will be described with reference to the flowcharts of FIGS.

5 and 6 and further with reference to the time charts of FIGS. 3 and 4 as appropriate. Here, a situation where a shifting request is made (the target shift speed is changed) at the same time as an internal combustion engine starting request is made (time T01 in FIG. 3) is assumed.

Figure 5:
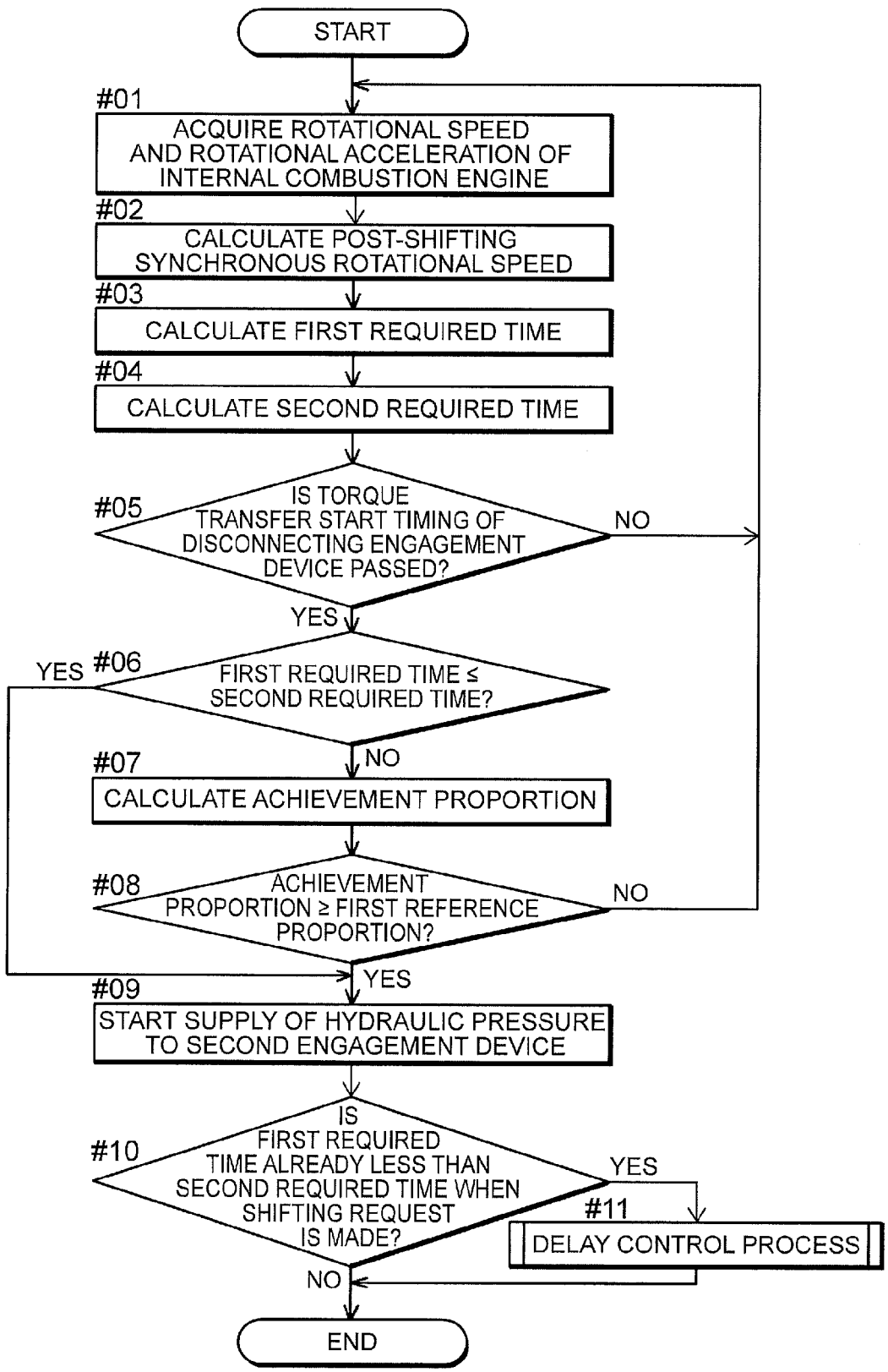
FIG. 5 is a flowchart illustrating the process procedure of the hydraulic pressure supply start timing decision process.
Figure 6:
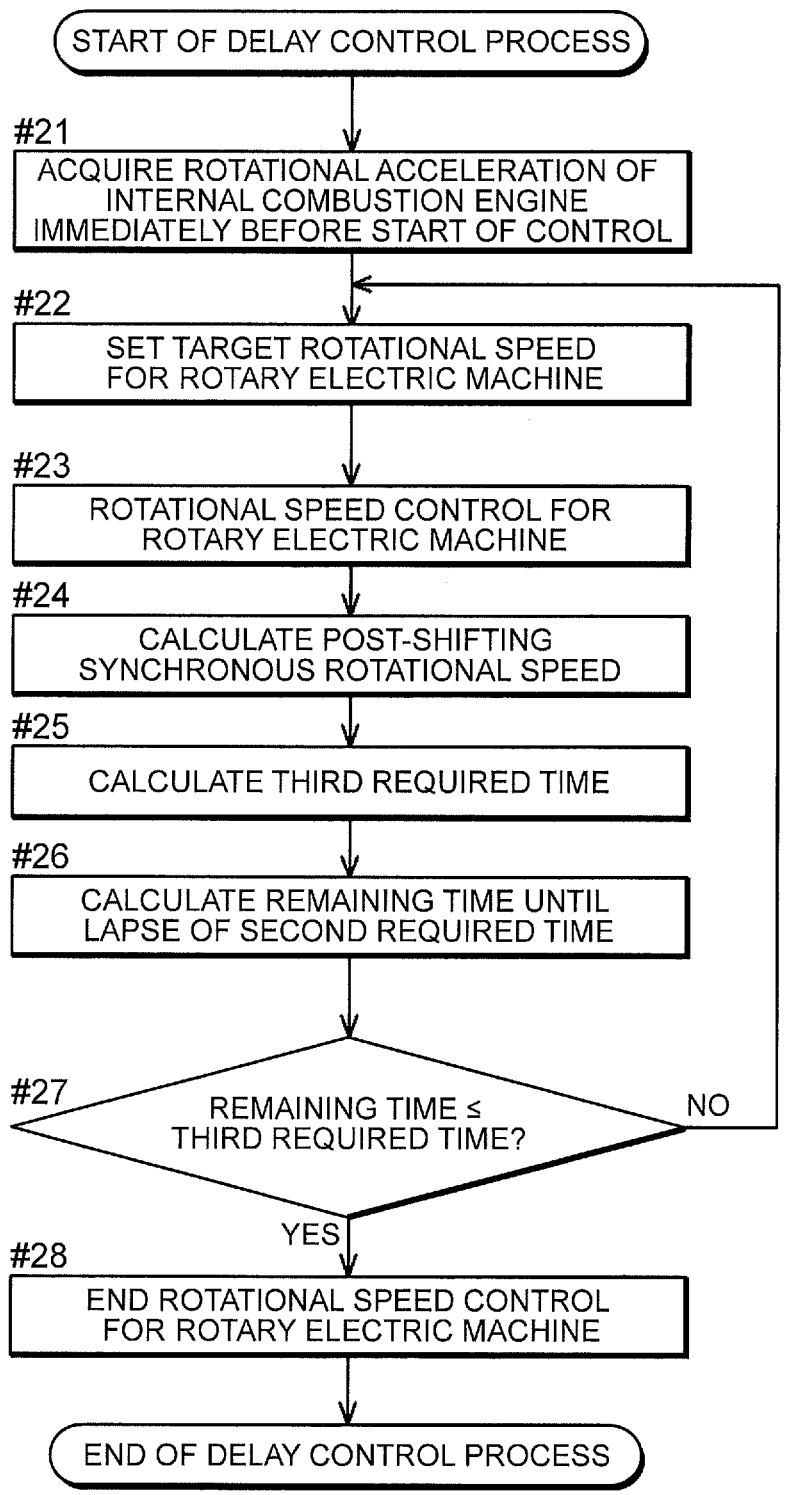
FIG. 6 is a flowchart illustrating the process procedure of the delay control process.
Figure 7:
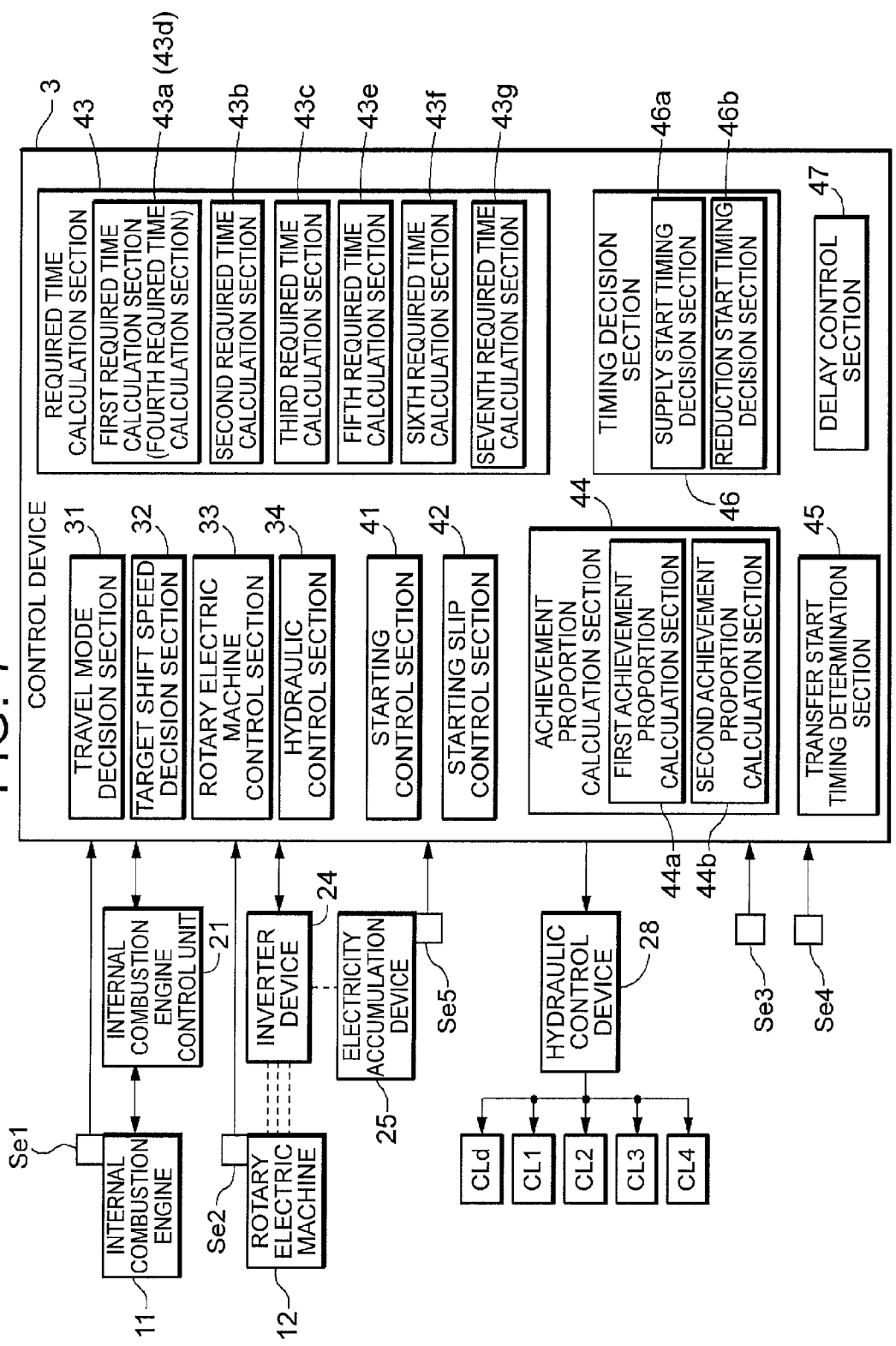
FIG. 7 is a block diagram illustrating a schematic configuration of a control device according to a second embodiment.

In the hydraulic pressure supply start timing decision process, as illustrated in FIG. 5, information on the rotational speed and the rotational acceleration of the internal combustion engine 11 at the time point is acquired with the internal combustion engine starting control and the shifting control overlapping (step #01), and the post-shifting synchronous rotational speed Ns1 is calculated (#02). The first required time calculation section 43a calculates the first required time Tr1 on the basis of the information on the rotational speed and the rotational acceleration of the internal combustion engine 11 and the post-shifting synchronous rotational speed Ns1 (#03). In addition, the second required time calculation section 43b calculates the second required time Tr2 on the basis of the oil temperature at the time point or the like (#04). The transfer start timing determination section 45 determines whether or not the torque transfer start timing of the disconnecting engagement device CLd has been passed and the disconnecting engagement device CLd has started generating a transfer torque capacity (#05). The processes in steps #01 to #05 are repeatedly executed until such a determination is made (#05: No).

If it is determined that the rotational speed of the internal combustion engine 11 has become higher than zero at time T02, for example, and it is determined that the torque transfer start timing has been passed (#05: Yes), the timing decision section 46 determines whether or not the first required time Tr1 is equal to or less than the second required time Tr2 on the basis of the first required time Tr1 and the second required time Tr2 calculated as described above (#06). While the first required time Tr1 is not equal to or less than the second required time Tr2 (#06: No), the achievement proportion calculation section 44 calculates the achievement proportion Rr1 on the basis of the rotational speed of the internal combustion engine 11 acquired in step #01 and the post-shifting synchronous rotational speed Ns1 calculated in step #02 (#07). It is determined, on the basis of the achievement proportion Rr1 and the first reference proportion Rs1 prescribed in advance, whether or not the achievement proportion Rr1 is equal to or more than the first reference proportion Rs1 (#08). The processes in steps #01 to #08 are repeatedly executed while the achievement proportion Rr1 is not equal to or more than the first reference proportion Rs1 (#08: No).

If it is determined that the first required time Tr1, which is decreased gradually along with the lapse of time, has become equal to or less than the second required time Tr2 at time T03, for example (#06: Yes), the timing decision section 46 determines that the supply start timing has arrived. In the case where it is determined that the achievement proportion Rr1 has become equal to or more than the first reference proportion Rs1 even before the first required time Tr1 becomes equal to or less than the second required time Tr2 (#08: Yes), the timing decision section 46 determines that the supply start timing has arrived. That is, the earlier one of the first supply start timing, when the first required time Tr1 has become equal to or less than the second required time Tr2, and the second supply start timing, when the achievement proportion Rr1 has become equal to or more than the first reference proportion Rs1, is determined as the supply start timing. Then, when the supply start timing is determined, the hydraulic control section 34 starts supply of a hydraulic pressure to the second engagement device CL2 (#09). Basically (#10: No), the hydraulic pressure supply start timing decision process is thus ended. After the internal combustion engine 11 and the rotary electric machine 12 are synchronized with each other (time T04), and when the rotational speed of the internal combustion engine 11 and the rotary electric machine 12 reaches the post-shifting synchronous rotational speed Ns1 (time T05), the second engagement device CL2 is brought into the direct engagement state, and the internal combustion engine starting control (including the starting slip control) and the shifting control are ended.

In the case where the first required time Tr1 is already less than the second required time Tr2 at the time point when a shifting request is made (#10: Yes, time T13 in FIG. 4), the delay control section 47 executes a delay control process (#11).

In the delay control process, information on the rotational acceleration of the internal combustion engine 11 immediately before the start of the delay control (in the example, at the time point when a shifting request is made) is acquired (#21). During the delay control, the rotary electric machine control section 33 sets the target rotational speed Nt for the rotary electric machine 12 continuously from during the starting slip control (#22), and the rotational speed control for the rotary electric machine 12 is executed (#23). In addition, the post-shifting synchronous rotational speed Ns1 is calculated (#24). In step #24, in the case where the vehicle speed is substantially constant, the results of calculation in step #03 may be used as they are. The third required time calculation section 43c calculates the third required time Tr3 on the basis of the target rotational speed Nt set in step #22 and the post-shifting synchronous rotational speed Ns1 calculated in step #24 (#25). In addition, the remaining time TL until the lapse of the second required time Tr2 is calculated on the basis of the second required time Tr2 calculated in step #03 and the elapsed time since supply of a hydraulic pressure to the second engagement device CL2 is started (#26).

The delay control section 47 determines, on the basis of the third required time Tr3 and the remaining time TL until the lapse of the second required time Tr2, whether or not the remaining time TL is equal to or less than the third required time Tr3 (#27). The processes in steps #22 to #27 are repeatedly executed while the remaining time TL is longer than the third required time Tr3 (#27: No). If it is determined that the remaining time TL, which is decreased gradually along with the lapse of time, has become equal to or less than the third required time Tr3 at time T14, for example (#27: Yes), the delay control section 47 determines that the delay control ending timing has arrived. Then, when the delay control ending timing is determined, the rotary electric machine control section 33 ends the rotational speed control for the rotary electric machine 12 by the rotary electric machine control section 33 (#28). The delay control process is thus ended. After that, the rotational speed of the internal combustion engine 11 and the rotary electric machine 12 is raised, and when the post-shifting synchronous rotational speed Ns1 is reached (time T15), the second engagement device CL2 is brought into the direct engagement state, and the internal combustion engine starting control (including the starting slip control) and the shifting control are ended.

2. Second Embodiment

A control device according to a second embodiment of the present invention will be described with reference to the drawings. In the present embodiment, a case where the target shift speed is changed stepwise from one before a change (G1) by way of a first target shift speed (G2) to a second target shift speed (G3) is assumed, and the control device 3 is configured to be able to appropriately decide the timing to start supply and reduction of a hydraulic pressure for each shifting engagement device also in such a case. Here, the first target shift speed corresponds to the target shift speed after the change in the first embodiment described above. In order to establish the first target shift speed, the first engagement device CL1 is caused to transition to the disengaged state, and the second engagement device CL2 is caused to transition to the direct engagement state. In order to establish the second target shift speed, meanwhile, a third engagement device CL3 is caused to transition from the direct engagement state by way of the slip engagement state to the disengaged state, and a fourth engagement device CL4 is caused to transition from the disengaged state by way of the slip engagement state to the direct engagement state (see FIG. 8). In the embodiment, the third engagement device CL3 corresponds to the "second specific engagement device" according to the present invention. In addition, the rotational speed of the transmission input shaft M matching the vehicle speed with the first target shift speed is determined as a first post-shifting synchronous rotational speed Ns1, and the rotational speed of the transmission input shaft M matching the vehicle speed with the second target shift speed is determined as a second post-shifting synchronous rotational speed Ns2.

2-1. Configuration of Control Device

The control device 3 according to the present embodiment is different from that according to the first embodiment described above in that the required time calculation section 43 further includes required time calculation sections 43d to 43g, the achievement proportion calculation section 44 includes a second achievement proportion calculation section 44b, and the timing decision section 46 includes a reduction start timing decision section 46b. A first achievement proportion calculation section 44a and a supply start timing decision section 46a according to the present embodiment correspond to the achievement proportion calculation section 44 and the timing decision section 46 according to the first embodiment described above, respectively, and are indicated separately for differentiation from the second achievement proportion calculation section 44b and the reduction start timing decision section 46b, respectively. The differences between the control device 3 according to the present embodiment and that according to the first embodiment described above will be mainly described below. The same points as those in the first embodiment described above will not be specifically described.

Figure 8:
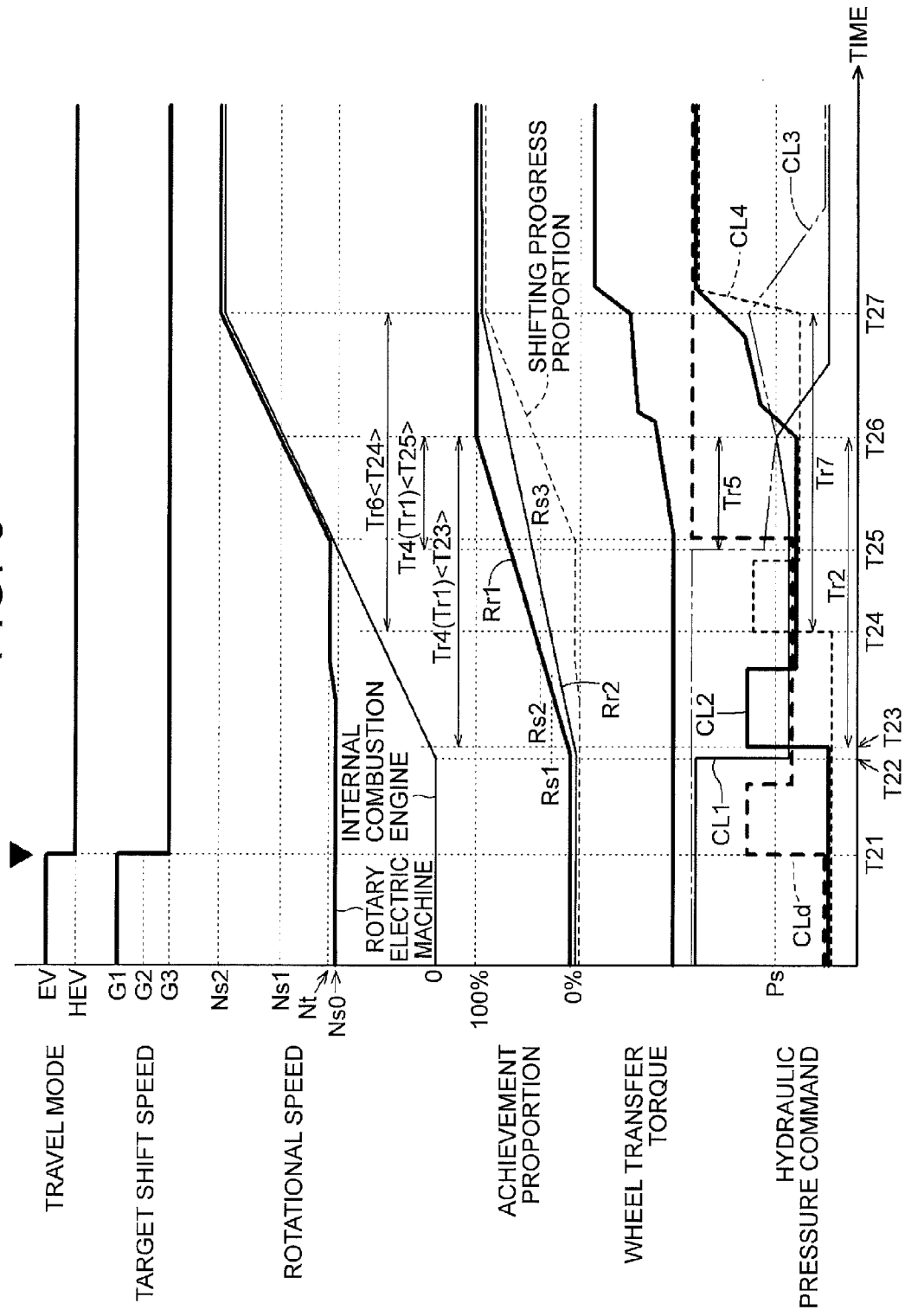
FIG. 8 is a time chart illustrating an example of an operating state of various components during a hydraulic pressure supply start timing decision process and a hydraulic pressure reduction start timing decision process.

A fourth required time calculation section 43d calculates a fourth required time Tr4, which is taken until the rotational speed of the internal combustion engine 11 reaches the first post-shifting synchronous rotational speed Ns1, on the basis of the current (at the time point) rotational speed and rotational acceleration of the internal combustion engine 11. The function of the fourth required time calculation section 43d is the same as the function of the first required time calculation section 43a according to the first embodiment described above. Therefore, in the present embodiment, the first required time calculation section 43a and the fourth required time calculation section 43d are provided as a common component. These components may be provided individually. The fourth required time calculation section 43d (first required time calculation section 43a) calculates the fourth required time Tr4 (=first required time Tr1) by dividing the difference between the first post-shifting synchronous rotational speed Ns1 and the rotational speed of the internal combustion engine at the time point by the rotational acceleration at the time point. In FIG. 8, by way of example, the fourth required times Tr4 at times T23 and T25 are indicated as Tr4(Tr1)<T23> and Tr4(Tr1)<T25>, respectively.

A fifth required time calculation section 43e calculates, for the third engagement device CL3, a fifth required time Tr5, which is taken since the start of reduction in hydraulic pressure to be supplied to the third engagement device CL3 until a set hydraulic pressure Ps prescribed in advance is reached. Here, the set hydraulic pressure Ps is set so as to maintain at least one of torque to be transferred to the output shaft O and the rotational acceleration of the transmission input shaft M at about the same level between before and after shifting to the first target shift speed (G2) as a first step and shifting to the second target shift speed (G3) as a second step, for example. The time required to reduce the supplied hydraulic pressure to the set hydraulic pressure Ps may be different among the engagement devices. Even for the same engagement device, the required time may be different in accordance with the oil temperature or the like. The required time is calculated through preliminary experiments or the like, and stored in advance in the form of a map or the like, for example, in the control device 3. The fifth required time calculation section 43e references a map or the like, and calculates the fifth required time Tr5 for the third engagement device CL3 in accordance with the oil temperature at the time point or the like.

A sixth required time calculation section 43f calculates a sixth required time Tr6, which is taken until the rotational speed of the internal combustion engine 11 reaches the second post-shifting synchronous rotational speed Ns2, on the basis of the current (at the time point) rotational speed and rotational acceleration of the internal combustion engine 11. The sixth required time calculation section 43f calculates the sixth required time Tr6 by dividing the difference between the second post-shifting synchronous rotational speed Ns2 and the rotational speed of the internal combustion engine at the time point by the rotational acceleration at the time point. In FIG. 8, by way of example, the sixth required time Tr6 at time T24 is indicated as Tr6<T24>.

A seventh required time calculation section 43g calculates a seventh required time Tr7, which is taken since supply of a hydraulic pressure to the fourth engagement device CL4 is started until the fourth engagement device CL4 starts generating a transfer torque capacity. The seventh required time calculation section 43g references a map or the like, and calculates the seventh required time Tr7 for the fourth engagement device CL4 in accordance with the oil temperature at the time point or the like.

The first achievement proportion calculation section 44a calculates a first shifting achievement proportion Rr1 of the current (at the time point) rotational speed of the internal combustion engine 11 to the first post-shifting synchronous rotational speed Ns1. The second achievement proportion calculation section 44b calculates a second shifting achievement proportion Rr2 of the current (at the time point) rotational speed of the internal combustion engine 11 to the second post-shifting synchronous rotational speed Ns2. The first post-shifting synchronous rotational speed Ns1 and the second post-shifting synchronous rotational speed Ns2 can be derived on the basis of the results of detection by the third rotation sensor Se3. The first achievement proportion calculation section 44a calculates the first shifting achievement proportion Rr1 at the time point by dividing the rotational speed of the internal combustion engine 11 at the time point by the first post-shifting synchronous rotational speed Ns1. The second achievement proportion calculation section 44b calculates the second shifting achievement proportion Rr2 at the time point by dividing the rotational speed of the internal combustion engine 11 at the time point by the second post-shifting synchronous rotational speed Ns2.

The supply start timing decision section 46a decides the timing to start supply of a hydraulic pressure to the second engagement device CL2 in the same manner as in the first embodiment described above. In the present embodiment, in correspondence with the stepwise change in target shift speed, the supply start timing decision section 46a also decides the timing to start supply of a hydraulic pressure to the fourth engagement device CL4 in addition to the timing to start supply of a hydraulic pressure to the second engagement device CL2. The supply start timing decision section 46a decides the timing to start supply of a hydraulic pressure to the fourth engagement device CL4 on the basis of the results of calculation by the sixth required time calculation section 43f, the seventh required time calculation section 43g, and the second achievement proportion calculation section 44b discussed above.

The supply start timing decision section 46a decides the timing to start supply of a hydraulic pressure to the fourth engagement device CL4 using whether initial hydraulic pressure supply (pre-charge) to the second engagement device CL2 has been completed as a condition. The time required until completion of the initial hydraulic pressure supply can be calculated in advance through preliminary experiments or the like, and can be set as a second determination time. The supply start timing decision section 46a decides the timing to start supply of a hydraulic pressure to the fourth engagement device CL4 using whether the second determination time has elapsed since the start of supply of a hydraulic pressure to the second engagement device CL2 as a condition. The timing to start supply of a hydraulic pressure to the second engagement device CL2 is decided using whether the torque transfer start timing of the disconnecting engagement device CLd has been passed as an essential condition. Thus, the timing to start supply of a hydraulic pressure to the fourth engagement device CL4 inevitably comes later than the torque transfer start timing of the disconnecting engagement device CLd.

The supply start timing decision section 46a compares the sixth required time Tr6 and the seventh required time Tr7, and decides the timing when it is determined that the sixth required time Tr6 has become equal to or less than the seventh required time Tr7 as a first candidate timing for the timing to start supply of a hydraulic pressure to the fourth engagement device CL4. Here, while the sixth required time Tr6 is decreased gradually along with the lapse of time, the seventh required time Tr7 is kept generally constant. Thus, the supply start timing decision section 46a preferably decides the timing when it is determined that the sixth required time Tr6, which is decreased gradually, has fallen within a determination range (range of (Tr7−γ) or more and Tr7 or less) that is determined in advance and that is equal to or less than the seventh required time Tr7 as the first candidate timing.

In addition, the supply start timing decision section 46a compares the second shifting achievement proportion Rr2 and a third reference proportion Rs3 prescribed in advance, and decides the timing when it is determined that the second shifting achievement proportion Rr2 has become equal to or more than the third reference proportion Rs3 as a second candidate timing for the timing to start supply of a hydraulic pressure to the fourth engagement device CL4. The supply start timing decision section 46a preferably decides the timing when it is determined that the second shifting achievement proportion Rr2, which is raised gradually, has fallen within a determination range that is determined in advance and that is equal to or more than the third reference proportion Rs3 as the second candidate timing. The third reference proportion Rs3 is calculated empirically through preliminary experiments or the like, and preferably set to such a value that the second candidate timing is relatively close to the first candidate timing and arrives later than the first candidate timing. The third reference proportion Rs3 may be set to different values among the engagement devices in the range of 10 [%] to 40 [%], for example. The third reference proportion Rs3 may be set to different values in accordance with the oil temperature and the vehicle speed. The third reference proportion Rs3 is stored in advance in the form of a map or the like together with or separately from the first reference proportion Rs1.

Then, the supply start timing decision section 46a finally decides the earlier one of the first candidate timing and the second candidate timing described above as the timing to start supply of a hydraulic pressure to the fourth engagement device CL4.

The reduction start timing decision section 46b decides the timing to start reduction in hydraulic pressure to be supplied to the third engagement device CL3. The reduction start timing decision section 46b decides the timing to start reduction in hydraulic pressure to be supplied to the third engagement device CL3 on the basis of the results of calculation by the fourth required time calculation section 43d (first required time calculation section 43a), the fifth required time calculation section 43e, and the first achievement proportion calculation section 44a discussed above.

The reduction start timing decision section 46b compares the fourth required time Tr4 and the fifth required time Tr5, and decides the timing when it is determined that the fourth required time Tr4 has become equal to or less than the fifth required time Tr5 as a first candidate timing for the timing to start reduction in hydraulic pressure to be supplied to the third engagement device CL3. Here, while the fourth required time Tr4 is decreased gradually along with the lapse of time, the fifth required time Tr5 is kept generally constant. Thus, the reduction start timing decision section 46b preferably decides the timing when it is determined that the fourth required time Tr4, which is decreased gradually, has fallen within a determination range (range of (Tr5−δ) or more and Tr5 or less) that is determined in advance and that is equal to or less than the fifth required time Tr5 as the first candidate timing.

In addition, the reduction start timing decision section 46b compares the first shifting achievement proportion Rr1 and a second reference proportion Rs2 prescribed in advance, and decides the timing when it is determined that the first shifting achievement proportion Rr1 has become equal to or more than the second reference proportion Rs2 as a second candidate timing for the timing to start reduction in hydraulic pressure to be supplied to the third engagement device CL3. The reduction start timing decision section 46b preferably decides the timing when it is determined that the first shifting achievement proportion Rr1, which is raised gradually, has fallen within a determination range that is determined in advance and that is equal to or more than the second reference proportion Rs2 as the second candidate timing. The second reference proportion Rs2 is calculated empirically through preliminary experiments or the like, and preferably set to such a value that the second candidate timing is relatively close to the first candidate timing and arrives later than the first candidate timing. The second reference proportion Rs2 may be set to different values among the engagement devices in the range of 10 [%] to 40 [%], for example. The second reference proportion Rs2 may be set to different values in accordance with the oil temperature and the vehicle speed. The second reference proportion Rs2 is stored in advance in the form of a map or the like together with or separately from the first reference proportion Rs1 and the third reference proportion Rs3.

Then, the reduction start timing decision section 46*b* finally decides the earlier one of the first candidate timing and the second candidate timing described above as the timing to start reduction in hydraulic pressure to be supplied to the third engagement device CL3.

Figure 9:
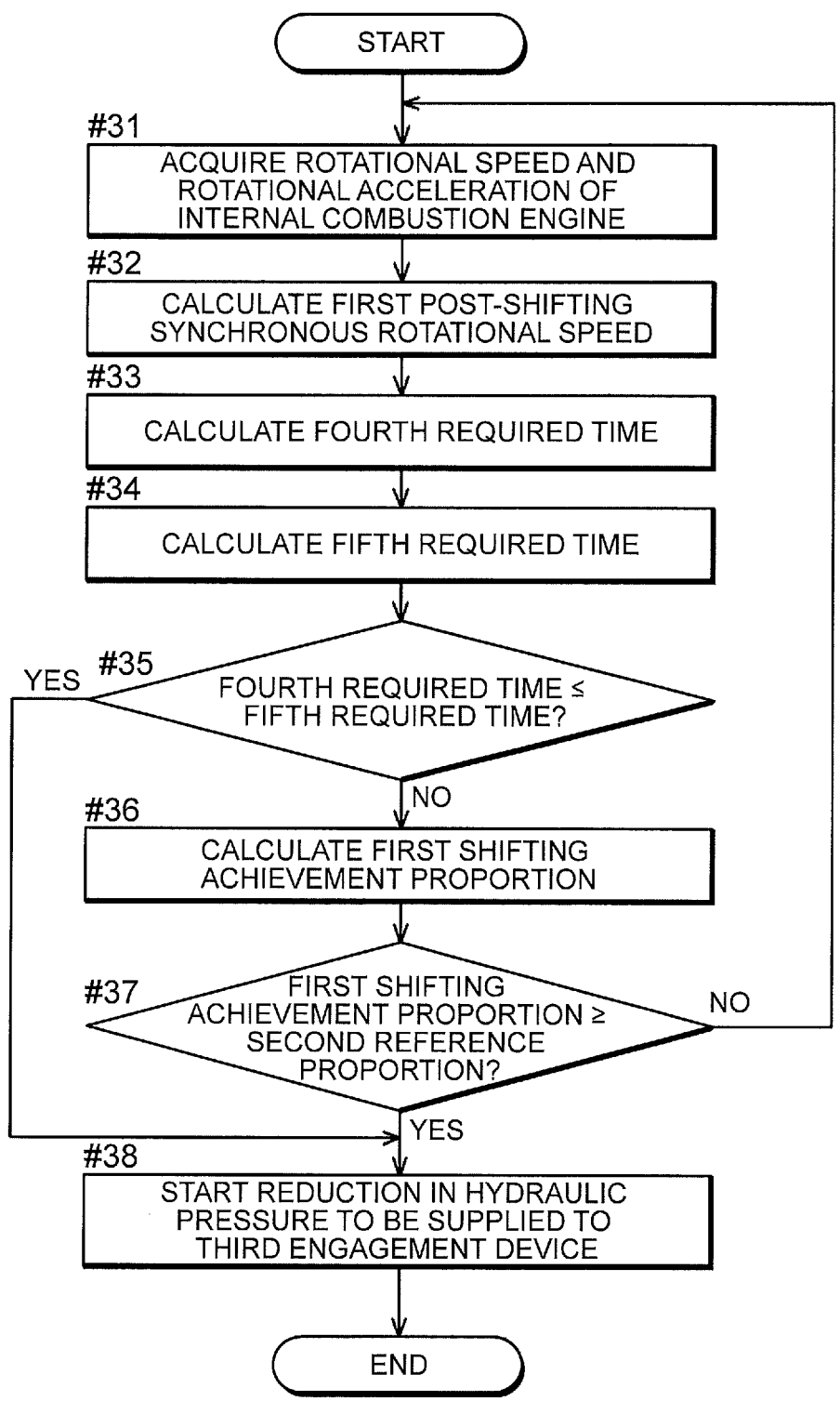
FIG. 9 is a flowchart illustrating the process procedure of the hydraulic pressure reduction start timing decision process.

2-2. Process Procedure of Hydraulic Pressure Reduction Start Timing Decision Process Next, the process procedure of the hydraulic pressure reduction start timing decision process according to the present embodiment will be described mainly with reference to the flowchart of FIG. 9. In the hydraulic pressure reduction start timing decision process, as illustrated in FIG. 9, information on the rotational speed and the rotational acceleration of the internal combustion engine 11 at the time point is acquired (step #31), and the first post-shifting synchronous rotational speed Ns1 is calculated (#32). The fourth required time calculation section 43*d* calculates the fourth required time Tr4 on the basis of the information on the rotational speed and the rotational acceleration of the internal combustion engine 11 and the first post-shifting synchronous rotational speed Ns1 (#33). In addition, the fifth required time calculation section 43*e* calculates the fifth required time Tr5 on the basis of the oil temperature at the time point or the like (#34).

The reduction start timing decision section 46*b* determines, on the basis of the fourth required time Tr4 and the fifth required time Tr5, whether or not the fourth required time Tr4 is equal to or less than the fifth required time Tr5 (#35). While the fourth required time Tr4 is not equal to or less than the fifth required time Tr5 (#35: No), the first achievement proportion calculation section 44*a* calculates the first shifting achievement proportion Rr1 on the basis of the rotational speed of the internal combustion engine 11 acquired in step #31 and the first post-shifting synchronous rotational speed Ns1 calculated in step #32 (#36). The reduction start timing decision section 46*b* determines, on the basis of the first shifting achievement proportion Rr1 and the second reference proportion Rs2 prescribed in advance, whether or not the first shifting achievement proportion Rr1 is equal to or more than the second reference proportion Rs2 (#37). The processes in steps #31 to #37 are repeatedly executed while the first shifting achievement proportion Rr1 is not equal to or more than the second reference proportion Rs2 (#37: No).

If it is determined that the fourth required time Tr4, which is decreased gradually along with the lapse of time, has become equal to or less than the fifth required time Tr5 at time T25 in FIG. 8, for example (#35: Yes), the reduction start timing decision section 46*b* determines that the reduction start timing has arrived. In the case where it is determined that the first shifting achievement proportion Rr1 has become equal to or more than the second reference proportion Rs2 even before the fourth required time Tr4 becomes equal to or less than the fifth required time Tr5 (#37: Yes), the reduction start timing decision section 46*b* determines that the reduction start timing has arrived. That is, the earlier one of the first candidate timing, when the fourth required time Tr4 has become equal to or less than the fifth required time Tr5, and the second candidate timing, when the first shifting achievement proportion Rr1 has become equal to or more than the second reference proportion Rs2, is determined as the reduction start timing. Then, when the reduction start timing is determined, the hydraulic control section 34 starts reduction in hydraulic pressure to be supplied to the third engagement device CL3 (#38). The hydraulic pressure reduction start timing decision process is thus ended.

Figure 10:
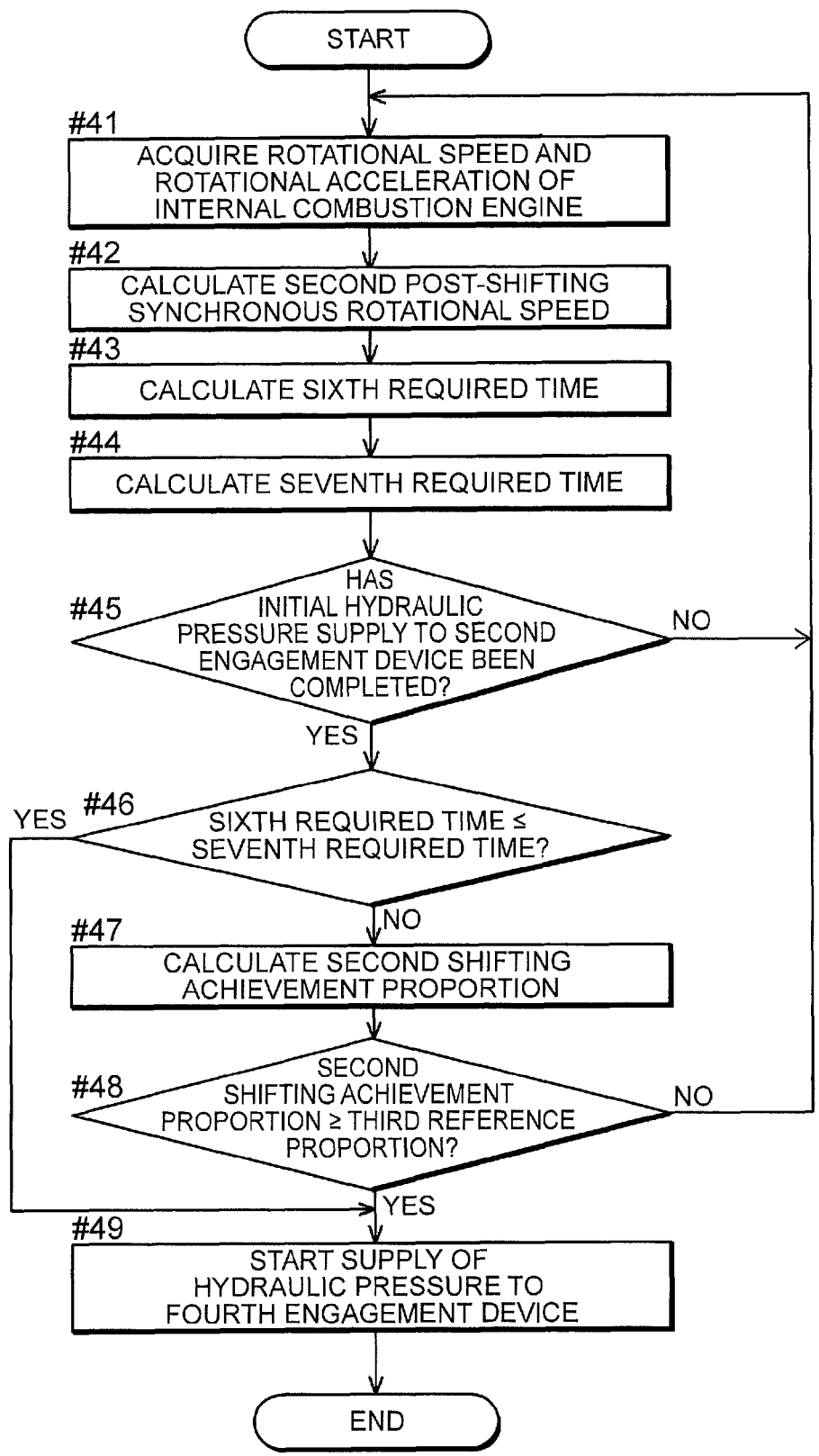
FIG. 10 is a flowchart illustrating the process procedure of a second hydraulic pressure supply start timing decision process.

2-3. Process Procedure of Second Hydraulic Pressure Supply Start Timing Decision Process The process procedure of a second hydraulic pressure supply start timing decision process (hydraulic pressure supply start timing decision process as the second step) according to the present embodiment will be described mainly with reference to the flowchart of FIG. 10. In the second hydraulic pressure supply start timing decision process, as illustrated in FIG. 10, information on the rotational speed and the rotational acceleration of the internal combustion engine 11 at the time point is acquired (step #41), and the second post-shifting synchronous rotational speed Ns2 is calculated (#42). The sixth required time calculation section 43*f* calculates the sixth required time Tr6 on the basis of the information on the rotational speed and the rotational acceleration of the internal combustion engine 11 and the second post-shifting synchronous rotational speed Ns2 obtained as described above (#43). In addition, the seventh required time calculation section 43*g* calculates the seventh required time Tr7 on the basis of the oil temperature at the time point or the like (#44). The supply start timing decision section 46*a* determines whether or not initial hydraulic pressure supply to the second engagement device CL2 has been completed (#45). The processes in steps #41 to #45 are repeatedly executed until such a determination is made (#45: No).

If it is determined that the initial hydraulic pressure supply has been completed (#45: Yes), the supply start timing decision section 46*a* determines, on the basis of the sixth required time Tr6 and the seventh required time Tr7 calculated as described above, whether or not the sixth required time Tr6 is equal to or less than the seventh required time Tr7 (#46). While the sixth required time Tr6 is not equal to or less than the seventh required time Tr7 (#46: No), the second achievement proportion calculation section 44*b* calculates the second shifting achievement proportion Rr2 on the basis of the rotational speed of the internal combustion engine 11 acquired in step #41 and the second post-shifting synchronous rotational speed Ns2 calculated in step #42 (#47). The supply start timing decision section 46*a* determines, on the basis of the second shifting achievement proportion Rr2 and the third reference proportion Rs3 prescribed in advance, whether or not the second shifting achievement proportion Rr2 is equal to or more than the third reference proportion Rs3 (#48). The processes in steps #41 to #48 are repeatedly executed while the second shifting achievement proportion Rr2 is not equal to or more than the third reference proportion Rs3 (#48: No).

If it is determined that the sixth required time Tr6, which is decreased gradually along with the lapse of time, has become equal to or less than the seventh required time Tr7 at time T24 in FIG. 8, for example (#46: Yes), the supply start timing decision section 46*a* determines that the supply start timing has arrived. In the case where it is determined that the second shifting achievement proportion Rr2 has become equal to or more than the third reference proportion Rs3 even before the sixth required time Tr6 becomes equal to or less than the seventh required time Tr7 (#48: Yes), the supply start timing decision section 46*a* determines that the supply start timing has arrived. That is, the earlier one of the first candidate timing, when the sixth required time Tr6 has become equal to or less than the seventh required time Tr7, and the second candidate timing, when the second shifting achievement proportion Rr2 has become equal to or more than the third reference proportion Rs3, is determined as the supply start timing. Then, when the supply start timing is determined, the hydraulic control section 34 starts supply of a hydraulic pressure to the fourth engagement device CL4 (#49). The second hydraulic pressure supply start timing decision process is thus ended. After the internal combustion engine 11 and the rotary electric machine 12 are synchronized with each other, the rotational speed of the internal combustion engine 11 and the rotary electric machine 12 reaches the first post-shifting synchronous rotational speed Ns1 (time T26). After the rotational speed of the internal combustion engine 11 and the rotary electric machine 12 further reaches the second post-shifting synchronous rotational speed Ns2 (time T27), the fourth engagement device CL4 is brought into the direct engagement state, and the internal combustion engine starting control (including the starting slip control) and the shifting control are ended. Also in the present embodiment, the drive force can be raised immediately after shifting is ended by executing the second hydraulic pressure supply start timing decision process.

3. Other Embodiments

Lastly, control devices according to other embodiments of the present invention will be described. A configuration disclosed in each of the following embodiments may be applied in combination with a configuration disclosed in any other embodiment unless any contradiction occurs.

(1) In each of the embodiments described above, the timing to start supply of a hydraulic pressure to the second engagement device CL2 is decided on the basis of both the magnitude relationship between the first required time Tr1 and the second required time Tr2 and the magnitude relationship between the achievement proportion Rr1 (first shifting achievement proportion Rr1) and the first reference proportion Rs1. However, embodiments of the present invention are not limited thereto. For example, in the case where the acquisition accuracy of the rotational acceleration of the internal combustion engine 11 is maintained at a high level and the first required time Tr1 can be calculated accurately, the timing to start supply of a hydraulic pressure to the second engagement device CL2 may be decided only on the basis of the magnitude relationship between the first required time Tr1 and the second required time Tr2. Alternatively, the timing to start supply of a hydraulic pressure to the second engagement device CL2 may be decided only on the basis of the magnitude relationship between the achievement proportion Rr1 (first shifting achievement proportion Rr1) and the first reference proportion Rs1. The timing to start reduction in hydraulic pressure to be supplied to the third engagement device CL3 and the timing to start supply of a hydraulic pressure to the fourth engagement device CL4 can also be considered in the same manner.

(2) In each of the embodiments described above, the timing to start supply of a hydraulic pressure to the second engagement device CL2 is decided using whether the torque transfer start timing of the disconnecting engagement device CLd has been passed as a condition. However, embodiments of the present invention are not limited thereto. For example, the timing to start supply of a hydraulic pressure to the second engagement device CL2 may be decided only on the basis of the rotational speed and the rotational acceleration of the internal combustion engine 11 without considering the torque transfer start timing of the disconnecting engagement device CLd. The timing to start supply of a hydraulic pressure to the fourth engagement device CL4 can also be considered in the same manner.

(3) In each of the embodiments described above, the present invention is applied to a situation where the target shift speed is changed in one step or two steps during execution of the internal combustion engine starting control. However, application of the present invention is not limited to such an occasion. The present invention may also be applied to an occasion where the target shift speed is changed stepwise in three or more steps. In this case, the timing to start supply of a hydraulic pressure to each shifting engagement device caused to transition to the direct engagement state in order to establish the target shift speed after the change and the timing to start reduction in hydraulic pressure to be supplied to each shifting engagement device caused to transition to the disengaged state are preferably decided on the basis of the same manner of thinking as that for the second embodiment described above.

(4) In each of the embodiments described above, in the drive device 1 to be controlled by the control device 3, the rotor of the rotary electric machine 12 rotates together with the transmission input shaft M at all times. However, embodiments of the present invention are not limited thereto. For example, the drive device 1 may include a fluid coupling (for example, a torque converter) having a connecting engagement device provided between the rotary electric machine 12 and the speed change mechanism 13, a dedicated transfer engagement device, or the like, and the rotor of the rotary electric machine 12 may be drivably coupled to the transmission input shaft M via such a component. The thus configured drive device 1 may also be controlled by the control device according to the present invention. In such a case, in order to suitably apply the present invention to the decision of the timing to start supply of a hydraulic pressure to the second engagement device CL2 or the like, the connecting engagement device or the transfer engagement device is preferably controlled to the direct engagement state.

(5) In each of the embodiments described above, starting slip control in which the first engagement device CL1, which is one of the plurality of shifting engagement devices, is brought into the slip engagement state is executed in the internal combustion engine starting control. However, embodiments of the present invention are not limited thereto. For example, a dedicated transfer engagement device may be provided on the power transfer path connecting between the internal combustion engine 11 and the wheels 15 on the wheels 15 side with respect to the speed change mechanism 13, and the transfer engagement device may be brought into the slip engagement state in place of the first engagement device CL1 in the starting slip control. Alternatively, the internal combustion engine starting control may be executed without the starting slip control. The present invention may also be suitably applied to such configurations.

(6) In each of the embodiments described above, the control device 3 includes the functional sections 31 to 47. However, embodiments of the present invention are not limited thereto. The assignment of the functional sections described above is merely illustrative, and a plurality of functional sections may be combined with each other, or a single functional section may be further divided into sub-sections.

(7) Also regarding other configurations, the embodiments disclosed herein are illustrative in all respects, and the present invention is not limited thereto. That is, a configuration not described in the claims of the present invention may be altered without departing from the object of the present invention.

INDUSTRIAL APPLICABILITY

The present invention may be applied to a control device that controls a vehicle drive device in which a disconnecting engagement device, a rotary electric machine, and a speed change mechanism are provided on a power transfer path connecting between an internal combustion engine and wheels and are arranged in this order from the internal combustion engine toward the wheels, such as a drive device for a hybrid vehicle of a so-called one-motor parallel type, for example.

DESCRIPTION OF THE REFERENCE NUMERALS

1 DRIVE DEVICE (VEHICLE DRIVE DEVICE)
3 CONTROL DEVICE
11 INTERNAL COMBUSTION ENGINE
12 ROTARY ELECTRIC MACHINE
13 SPEED CHANGE MECHANISM
15 WHEEL
41 STARTING CONTROL SECTION
42 STARTING SLIP CONTROL SECTION
43a FIRST REQUIRED TIME CALCULATION SECTION
43b SECOND REQUIRED TIME CALCULATION SECTION
43c THIRD REQUIRED TIME CALCULATION SECTION
43d FOURTH REQUIRED TIME CALCULATION SECTION
43e FIFTH REQUIRED TIME CALCULATION SECTION
44 ACHIEVEMENT PROPORTION CALCULATION SECTION
45 TRANSFER START TIMING DETERMINATION SECTION
46 TIMING DECISION SECTION
46a SUPPLY START TIMING DECISION SECTION
46b REDUCTION START TIMING DECISION SECTION
47 DELAY CONTROL SECTION
M TRANSMISSION INPUT SHAFT (INPUT-SIDE ROTARY MEMBER)
CLd DISCONNECTING ENGAGEMENT DEVICE
CL1 FIRST ENGAGEMENT DEVICE (SHIFTING ENGAGEMENT DEVICE)
CL2 SECOND ENGAGEMENT DEVICE (SHIFTING ENGAGEMENT DEVICE, SPECIFIC ENGAGEMENT DEVICE)
CL3 THIRD ENGAGEMENT DEVICE (SHIFTING ENGAGEMENT DEVICE, SECOND SPECIFIC ENGAGEMENT DEVICE)
Tr1 FIRST REQUIRED TIME
Tr2 SECOND REQUIRED TIME
Tr3 THIRD REQUIRED TIME
Tr4 FOURTH REQUIRED TIME
Tr5 FIFTH REQUIRED TIME
TL REMAINING TIME
Rr1 FIRST SHIFTING ACHIEVEMENT PROPORTION (ACHIEVEMENT PROPORTION)
Rs1 FIRST REFERENCE PROPORTION
Rs2 SECOND REFERENCE PROPORTION
Nt TARGET ROTATIONAL SPEED
Ns0 PRE-SHIFTING SYNCHRONOUS ROTATIONAL SPEED
Ns1 FIRST POST-SHIFTING SYNCHRONOUS ROTATIONAL SPEED (POST-SHIFTING SYNCHRONOUS ROTATIONAL SPEED)
Ns2 SECOND POST-SHIFTING SYNCHRONOUS ROTATIONAL SPEED

The invention claimed is:

1. A control device configured to control a vehicle drive device in which a disconnecting engagement device, a rotary electric machine, and a speed change mechanism are provided on a power transfer path connecting between an internal combustion engine and wheels and are arranged in this order from the internal combustion engine toward the wheels and the speed change mechanism is configured to switch between a plurality of shift speeds on the basis of control of respective states of engagement of a plurality of shifting engagement devices provided in the speed change mechanism, the control device comprising:
a starting control section configured to execute internal combustion engine starting control in which the internal combustion engine in a stationary state is started while causing the disconnecting engagement device to transition from a disengaged state to a direct engagement state;
a timing decision section configured to decide, on the basis of a rotational speed of the internal combustion engine, a supply start timing to start supply of a hydraulic pressure to a specific engagement device, which is one of the plurality of shifting engagement devices and is caused to transition from a disengaged state to a direct engagement state in order to establish a target shift speed for the speed change mechanism after a change, in the case where the target shift speed is changed during execution of the internal combustion engine starting control;
a first required time calculation section configured to calculate a first required time on the basis of a current rotational speed and rotational acceleration of the internal combustion engine, the first required time being a time until the rotational speed of the internal combustion engine reaches a post-shifting synchronous rotational speed which is a rotational speed of an input-side rotary member with the target shift speed after the change matching a rotational speed of the wheels, the input-side rotary member being a rotary member in the speed change mechanism that is the closest to the internal combustion engine along the power transfer path; and
a second required time calculation section configured to calculate a second required time which is a calculated time from when supply of a hydraulic pressure to the specific engagement device is started until the specific engagement device starts generating a transfer torque capacity,
wherein the timing decision section is configured to compare the first required time and the second required time, and decides a timing when it is determined that the first required time has become equal to or less than the second required time as the supply start timing.

2. The control device for a vehicle drive device according to claim 1, wherein
the timing decision section is further configured to decide a timing when it is determined that the first required time, which is decreased gradually, has fallen within a determination range that is determined in advance and that is equal to or less than the second required time as the supply start timing.

3. The control device for a vehicle drive device according to claim 1, further comprising:
an achievement proportion calculation section configured to calculate an achievement proportion of the current rotational speed of the internal combustion engine to the post-shifting synchronous rotational speed, wherein
the timing decision section further configured to decide the earlier one of a first supply start timing and a second supply start timing as the supply start timing, the first supply start timing being the supply start timing which is determined in accordance with a relationship between the first required time and the second required time, and the second supply start timing being a timing when it is determined that the achievement proportion has become equal to or more than a first reference proportion prescribed in advance.

4. The control device for a vehicle drive device according to claim 1, further comprising:
a transfer start timing determination section configured to determine a torque transfer start timing which is a timing when the disconnecting engagement device starts generating a transfer torque capacity, wherein
the timing decision section further configured to decide the supply start timing using whether the torque transfer start timing has been passed as a condition.

5. The control device for a vehicle drive device according to claim 1, further comprising:
a delay control section configured to execute delay control, in which the rotary electric machine is controlled such that a rise in rotational speed of the internal combustion engine is delayed, until it is determined that the first required time has fallen within a determination range that is determined in advance and that is equal to or less than the second required time after the disconnecting engagement device is brought into a direct engagement state in the case where the supply start timing, which is determined in accordance with a relationship between the first required time and the second required time, is already passed at a time point when the target shift speed is changed.

6. The control device for a vehicle drive device according to claim 5, wherein
the delay control section further configured to execute rotational speed control, in which a rotational speed of the rotary electric machine is controlled so as to approach a target rotational speed, during the delay control, compares a third required time and a remaining time until a lapse of the second required time, the third required time being a time required until an estimated rotational speed of the internal combustion engine, which is calculated on the basis of a rotational acceleration of the internal combustion engine before the delay control is started and the target rotational speed, reaches the post-shifting synchronous rotational speed, and ends the rotational speed control and raises the rotational speed of the internal combustion engine and the rotary electric machine when it is determined that the remaining time has fallen within a determination range that is determined in advance and that is equal to or less than the third required time.

7. The control device for a vehicle drive device according to claim 1, wherein
the internal combustion engine starting control is configured to start at a time point when a request to start the internal combustion engine is received and ended at a time point when the specific engagement device is caused to transition from a slip engagement state to a direct engagement state.

* * * * *